United States Patent
Park et al.

(10) Patent No.: US 11,477,383 B2
(45) Date of Patent: Oct. 18, 2022

(54) METHOD FOR PROVIDING PREVIEW AND ELECTRONIC DEVICE FOR DISPLAYING PREVIEW

(71) Applicant: Samsung Electronics Co., Ltd., Suwon-si (KR)

(72) Inventors: Chansik Park, Suwon-si (KR); Hyuntaek Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 17/083,907

(22) Filed: Oct. 29, 2020

(65) Prior Publication Data
US 2021/0136297 A1 May 6, 2021

(30) Foreign Application Priority Data
Nov. 1, 2019 (KR) .......................... 10-2019-0138961

(51) Int. Cl.
*H04N 5/232* (2006.01)
*G06N 3/08* (2006.01)
(Continued)

(52) U.S. Cl.
CPC ......... *H04N 5/232935* (2018.08); *G06N 3/08* (2013.01); *G09G 3/3406* (2013.01); *H04N 5/2355* (2013.01); *H04N 5/232939* (2018.08)

(58) Field of Classification Search
CPC ....... H04N 5/232935; H04N 5/232939; H04N 5/2355; G06N 3/08; G09G 3/3406
See application file for complete search history.

(56) References Cited

U.S. PATENT DOCUMENTS 10,242,627 B2   3/2019 Farrell et al.
2011/0292246 A1* 12/2011 Brunner .................... G06T 5/40
                                                    348/231.99
(Continued)

FOREIGN PATENT DOCUMENTS

KR   10-2011-0048811 A    5/2011
WO      2016/104386 A1    6/2016

OTHER PUBLICATIONS

International Search Report dated Feb. 18, 2021, issued in International Application No. PCT/KR2020/014889.
(Continued)

*Primary Examiner* — Ahmed A Berhan
(74) *Attorney, Agent, or Firm* — Jefferson IP Law, LLP

(57) ABSTRACT

A method for providing a preview and an electronic device for displaying a preview are provided. The electronic device includes a camera module, a display, a processor operatively connected to the camera module and the display, and a memory operatively connected to the processor, wherein the memory stores instructions which, when executed, cause the processor to acquire original image frames through the camera module, display, on the display, first preview image frames corresponding to the acquired original image frames, receive an input for requesting dynamic-tone-mapping-based recording, perform the dynamic-tone-mapping-based recording in response to the reception of the input, and while performing the dynamic-tone-mapping-based recording, generate second preview image frames by performing dynamic-tone-mapping processing to first preview image frames acquired after a time point at which the input is received, and display the generated second preview image frames on the display. Various other embodiments are possible.

20 Claims, 20 Drawing Sheets

(51) Int. Cl.
*G09G 3/34* (2006.01)
*H04N 5/235* (2006.01)

(56) References Cited

U.S. PATENT DOCUMENTS

| | | |
|---|---|---|
| 2017/0359488 A1 | 12/2017 | Chen et al. |
| 2018/0082661 A1 | 3/2018 | Kang et al. |
| 2018/0139429 A1* | 5/2018 | Park .................. G09G 5/10 |
| 2018/0181794 A1* | 6/2018 | Benini ............... G06K 9/00268 |
| 2019/0052790 A1 | 2/2019 | Kang et al. |
| 2019/0222721 A1 | 7/2019 | Yamamoto et al. |
| 2019/0370946 A1* | 12/2019 | Samadani .......... H04N 1/32101 |

OTHER PUBLICATIONS

Extended European Search Report dated Sep. 8, 2022, issued in European Patent Application No. 20880689.3.

\* cited by examiner

METHOD FOR PROVIDING PREVIEW AND ELECTRONIC DEVICE FOR DISPLAYING PREVIEW

CROSS-REFERENCE TO RELATED APPLICATION(S)

This application is based on and claims priority under 35 U.S.C. § 119(a) of a Korean patent application number 10-2019-0138961, filed on Nov. 1, 2019, in the Korean Intellectual Property Office, the disclosure of which is incorporated by reference herein in its entirety.

BACKGROUND

1. Field

The disclosure relates to a method for providing a preview and an electronic device for displaying a preview.

2. Description of Related Art

Electronic devices (e.g., mobile terminals, smartphones, or wearable terminals) may provide various functions (e.g., a music reproduction function, a navigation function, a short-range wireless communication (e.g., Bluetooth, wireless fidelity (Wi-Fi), or near-field communication (NFC)) function, a fingerprint recognition function, an electronic payment function, etc.).

Additionally, electronic devices may provide a function of taking a photo (an image) or capturing (or recording) a moving image. For example, an electronic device may take a photo or capture a moving image using a front camera positioned on the front surface of the electronic device or a rear camera positioned on the rear surface of the electronic device.

The above information is presented as background information only to assist with an understanding of the disclosure. No determination has been made, and no assertion is made, as to whether any of the above might be applicable as prior art with regard to the disclosure.

SUMMARY

An electronic device provides a moving-image capture function using dynamic-tone-mapping (DTM). For example, the DTM may include high dynamic range (HDR)10+™ or Dolby Vision™. The DTM may apply tone mapping to each frame or to each scene to generate a realistic image. To this end, an image frame acquired at the time of dynamic-tone-mapping-based moving image capture needs to be analyzed to generate tone-mapping information appropriate for a corresponding image frame. However, because a predetermined time is required to generate the tone-mapping information, it is difficult for an electronic device to provide, in real time, a preview image to which dynamic tone mapping is applied. Accordingly, an electronic device may provide a preview image to which no dynamic tone mapping is applied at the time of dynamic-tone-mapping-based moving image capture. This may lead to a difference between the quality of a stored moving image and the quality of a preview image in an electronic device. In addition, a user may not check the quality of a stored moving image in advance through a preview image and may experience inconvenience caused therefrom.

Aspects of the disclosure are to address at least the above-mentioned problems and/or disadvantages and to provide at least the advantages described below. Accordingly, an aspect of the disclosure is to provide a method for providing a preview image, to which dynamic tone mapping is applied, in real time and an electronic device for displaying a preview.

Additional aspects will be set forth in part in the description which follows and, in part, will be apparent from the description, or may be learned by practice of the presented embodiments.

In accordance with an aspect of the disclosure, an electronic device is provided. The electronic device includes for example a camera module, a display, a processor operatively connected to the camera module and the display, and a memory operatively connected to the processor, wherein the memory may store instructions which, when executed, cause the processor to acquire original image frames through the camera module, display, on the display, first preview image frames corresponding to the acquired original image frames, receive an input for requesting dynamic-tone-mapping-based recording, perform the dynamic-tone-mapping-based recording in response to the reception of the input, and while performing the dynamic-tone-mapping-based recording, generate second preview image frames by performing dynamic-tone-mapping processing to first preview image frames acquired after the time point at which the input is received, and display the generated second preview image frames on the display.

In accordance with another aspect of the disclosure, a method for providing a preview by an electronic device is provided. The method includes acquiring original image frames through a camera module, displaying, on a display, first preview image frames corresponding to the acquired original image frames, receiving an input for requesting dynamic-tone-mapping-based recording, performing the dynamic-tone-mapping-based recording in response to the reception of the input, and while performing the dynamic-tone-mapping-based recording generating second preview image frames by performing dynamic-tone-mapping processing to first preview image frames acquired after the time point at which the input is received, and displaying the generated second preview image frames on the display.

In accordance with another aspect of the disclosure, an electronic device is provided. The electronic device includes for example a camera module, a display, a processor operatively connected to the camera module and the display, and a memory operatively connected to the processor, wherein the memory stores instructions which, when executed, cause the processor to display, on the display, preview image frames corresponding to original image frames acquired through the camera module, and, in response to a first user input enabling a function of dynamic-tone-mapping-based recording or a second user input for requesting the dynamic-tone-mapping-based recording, adjust the brightness of the display based on at least one of a designated brightness, a designated scale ratio of brightness, static-tone-mapping information, or a result of analysis of a preview image frame after the time point at which the first user input is received.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, it should be noted that like reference numbers are used to depict the same or similar elements, features, and structures

DETAILED DESCRIPTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
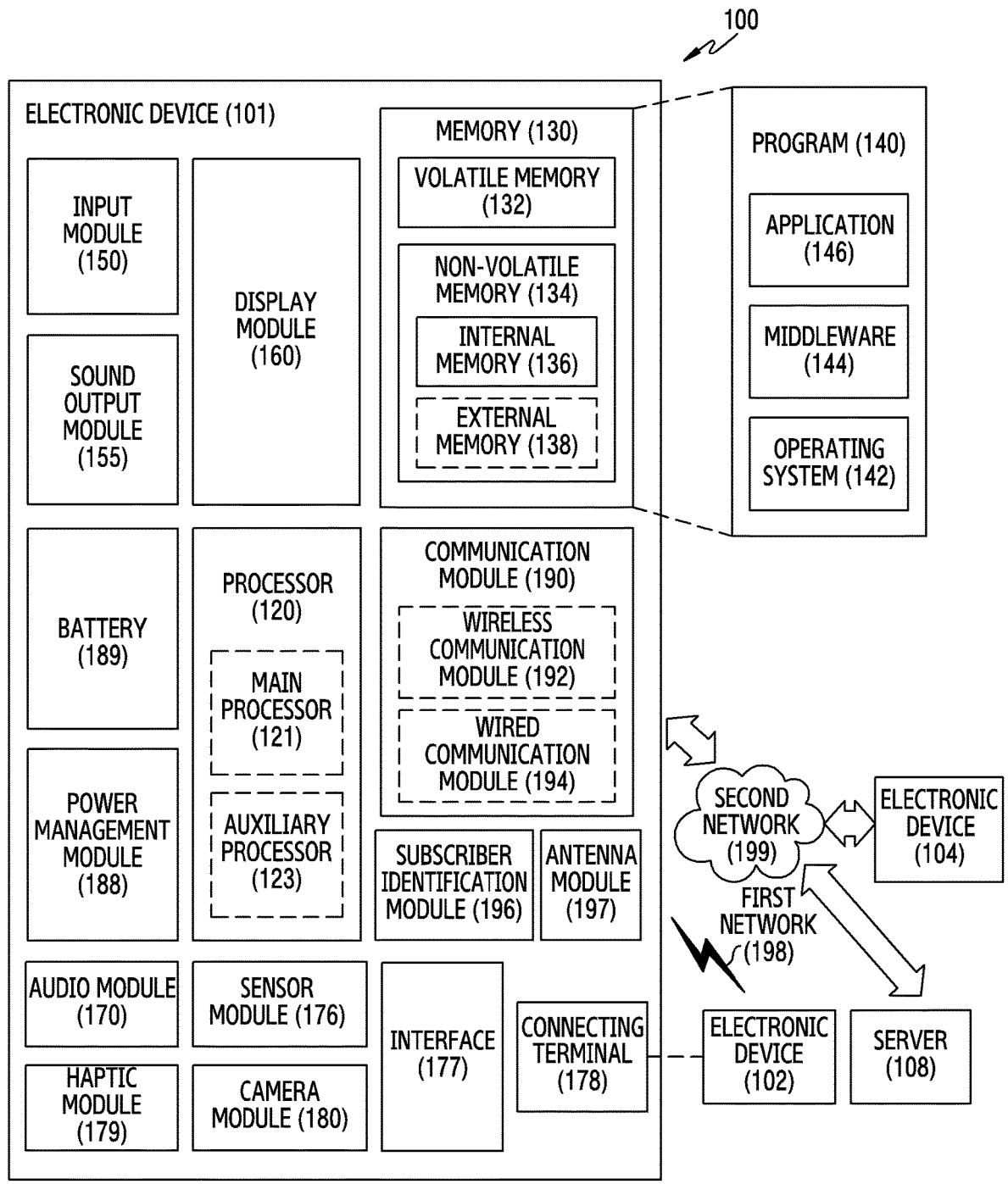
FIG. 1 is a block diagram of an electronic device in a network environment according to an embodiment of the disclosure.

FIG. 1 is a block diagram illustrating an electronic device 101 in a network environment 100 according to an embodiment of the disclosure.

Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment of the disclosure, the electronic device 101 may communicate with the electronic device 104 via the server 108. According to an embodiment of the disclosure, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments of the disclosure, at least one (e.g., the connecting terminal 178) of the components may be omitted from the electronic device 101, or one or more other components may be added in the electronic device 101. In some embodiments of the disclosure, some (e.g., the sensor module 176, the camera module 180, or the antenna module 197) of the components may be implemented as single integrated circuitry.

The processor 120 may execute, for example, software (e.g., a program 140) to control at least one other component (e.g., a hardware or software component) of the electronic device 101 coupled with the processor 120, and may perform various data processing or computation. According to an embodiment of the disclosure, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment of the disclosure, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, if the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment of the disclosure, the auxiliary processor 123 (e.g., an image signal processor or a communication processor) may be implemented as part of another component (e.g., the camera module 180 or the communication module 190) functionally related to the auxiliary processor 123. According to an embodiment of the disclosure, the auxiliary processor 123 (e.g., a neural network processing device) may include a hardware structure specialized for processing an artificial intelligence model. The artificial intelligence model may be created through machine learning. Such learning may be performed, for example, in the electronic device 101 on which artificial intelligence is performed, or may be performed through a separate server (e.g., the server 108). A learning algorithm may include, for example, supervised learning, unsupervised learning, semi-supervised learning, or reinforcement learning, but is not limited to the aforementioned example. The artificial intelligence model may include a plurality of artificial neural network layers. The artificial neural network may be one of a Deep Neural Network (DNN), a Convolutional Neural Networks (CNN), a Recurrent Neural Network (RNN), a Restricted Boltzmann Machine (RBM), a Deep Belief Network (DBN), a Bidirectional Recurrent Deep Neural Network (BRDNN), a deep Q-network, or a combination of at least two of those elements, but is not limited to the aforementioned example. In addition to the hardware structure, additionally or alternatively, the artificial intelligence model may include a software structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by other component (e.g., the processor 120) of the electronic device 101, from the outside (e.g., a user) of the electronic device 101. The input module 150 may include, for example, a microphone, a mouse, a keyboard, a key (e.g., button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for an incoming calls. According to an embodiment of the disclosure, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment of the disclosure, the display module 160 may include touch sensor adapted to detect a touch, or a pressure sensor adapted to measure the intensity of force incurred by the touch.

The audio module 170 may convert a sound into an electrical signal and vice versa. According to an embodiment of the disclosure, the audio module 170 may obtain the sound via the input module 150, or output the sound via the sound output module 155, or an external electronic device (e.g., an electronic device 102) (e.g., a speaker or a headphone) directly or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment of the disclosure, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment of the disclosure, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment of the disclosure, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment of the disclosure, the haptic module 179 may include, for example, a motor, a piezoelectric element, or an electric stimulator.

The camera module 180 may capture an image or moving images. According to an embodiment of the disclosure, the camera module 180 may include one or more lenses, image sensors, image signal processors, or flashes.

The power management module 188 may manage power supplied to the electronic device 101. According to an embodiment of the disclosure, the power management module 188 may be implemented as at least part of, for example, a power management integrated circuit (PMIC).

The battery 189 may supply power to at least one component of the electronic device 101. According to an embodiment of the disclosure, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment of the disclosure, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device 104 via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify or authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network evolved from a 4G network and a next-generation communication technology, for example, a New Radio (NR) access technology. The NR access technology may support enhanced Mobile Broadband (eMBB), massive Machine Type Communications (mMTC), or Ultra-Reliable and Low-Latency Communications (URLLC). The wireless communication module 192 may support, for example, a high frequency band (e.g., an mmWave band) to achieve a high data rate. The wireless communication module 192 may support various technologies for securing performance in a high frequency band, for example, beamforming, massive array Multiple-Input and Multiple-Output (MIMO), and Full-Dimensional MIMO (FD-MIMO), an array antenna, analog beam-forming, or a large scale antenna. The wireless communication module 192 may support various requirements defined in the electronic device 101, an external electronic device (e.g., the electronic device 104), or a network system (e.g., the second network 199). According to an embodiment of the disclosure, the wireless communication module 192 may support a peak data rate (e.g., 20 Gbps or more) for realizing eMBB, a loss coverage (e.g., 164 dB or less) for realizing mMTC, or U-plane latency (e.g., 0.5 ms or less or a round trip of 1 ms or less for each of downlink (DL) and uplink (UL)) for realizing URLCC.

The antenna module 197 may transmit or receive a signal or power to or from the outside (e.g., the external electronic device) of the electronic device 101. According to an embodiment of the disclosure, the antenna module 197 may include an antenna including a radiating element including a conductive material or a conductive pattern formed in or on a substrate (e.g., PCB). According to an embodiment of the disclosure, the antenna module 197 may include a plurality of antennas (e.g., array antenna). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment of the disclosure, another component (e.g., a radio frequency integrated circuit (RFIC)) other than the radiating element may be additionally formed as part of the antenna module 197.

According to various embodiments of the disclosure, the antenna module 197 may construct an mmWave antenna module. According to an embodiment of the disclosure, the mmWave antenna module may include a printed circuit board, an RFIC disposed on or adjacent to a first face (e.g., a bottom face) of the printed circuit board and capable of supporting a designated high frequency band (e.g., an mmWave band), and a plurality of antennas (e.g., an array antenna) disposed on or adjacent to a second face (e.g., a top face or a side face) of the printed circuit board and capable of transmitting or receiving a signal in the designated high frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment of the disclosure, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment of the disclosure, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To this end, for example, technologies of cloud computing, distributed computing, Mobile Edge Computing (MEC), or client-server computing may be used. The electronic device 101 may provide an ultra-low latency service using, for example, distributed computing or mobile edge computing. In another embodiment of the disclosure, the external electronic device 104 may include an Internet of Things (IoT) device. The server 108 may be an intelligent server using machine learning and/or neural networks. According to an embodiment of the disclosure, the external electronic device 104 or the server 108 may be included in the second network 199. The electronic device 101 may be applied to an intelligent service (e.g., a smart home, a smart city, a smart car, or health care) based on a 5G communication technique and an IoT related technique.

Figure 2:
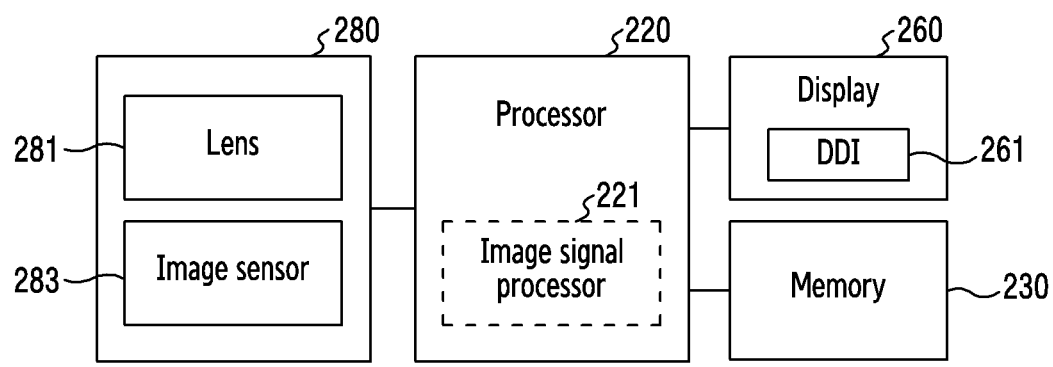
FIG. 2 is a block diagram of an electronic device according to an embodiment of the disclosure.
Figure 3:
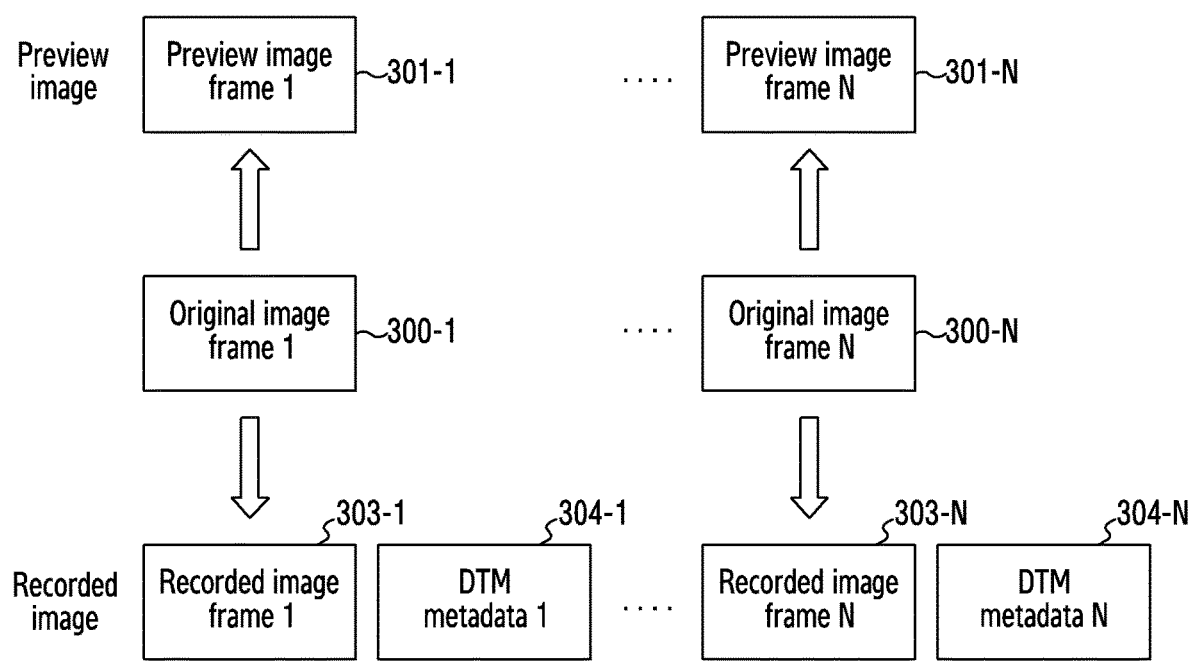
FIG. 3 illustrates a dynamic-tone-mapping-based moving image frame according to an embodiment of the disclosure.

FIG. 2 is a block diagram of an electronic device according to an embodiment of the disclosure, and FIG. 3 illustrates a dynamic-tone-mapping-based moving image frame according to an embodiment of the disclosure.

Referring to FIGS. 2 and 3, an electronic device 201 (e.g., the electronic device 101) according to an embodiment may include a camera module 280 (e.g., the camera module 180), a processor 220 (e.g., the processor 120), a display 260 (e.g., the display device 160), and/or memory 230 (e.g., the memory 130).

According to various embodiments of the disclosure, the camera module 280 may capture an image and/or moving images. The camera module 280 may include a lens 281 or an image sensor 283. The lens 281 is, for example, a transparent glass body for refracting light, and may be formed in at least one combination of at least one convex lens or at least one concave lens. The lens 281 may include at least one of a standard lens, a wide-angle lens, a telephoto lens, or a zoom lens. The image sensor 283 may detect incident light through the lens 281 and generate image data (e.g., raw image data) (hereinafter, referred to as an "original image frame"). For example, the image data may be generated in units of frames.

According to various embodiments of the disclosure, the processor 220 may control the processing of an image acquired through the camera module 280. The processor 220 may include, for example, an image signal processor 221. As illustrated in FIG. 3, the image signal processor 221 may apply image processing to an original image frame and generate a preview image frame and a recorded image frame. For example, the image signal processor 221 may adjust the resolution and/or size of an original image frame to generate a preview image frame and a recorded image frame. The resolution and/or size of the preview image frame may differ from the resolution and/or size of the recorded image frame.

According to various embodiments of the disclosure, a preview image frame may be generated in a format supporting YU, which is a representation scheme using luminance (Y) and two chrominance signals (U and V). A recorded image frame may be generated in a format supporting red, green, blue (RGB), which is a representation scheme using three primary colors of light.

According to various embodiments of the disclosure, the frame rate, in frames per second (FPS), of the preview image frame and the frame rate of the recorded image frame may be different from each other, but, for the convenience of description, it is assumed in various embodiments of the disclosure that the frame rate of the preview image frame and the frame rate of the recorded image frame are identical.

According to various embodiments of the disclosure, during normal moving-image recording, the image signal processor 221 may convert the resolution and/or the size of an original image frame to be suitable for the specifications of the display 260 and generate a preview image frame.

According to various embodiments of the disclosure, during dynamic-tone-mapping-based moving-image recording, the image signal processor 221 may apply image processing to an image to make the image similar to an image to which dynamic tone mapping is applied, or may apply (or use) the dynamic tone mapping so as to generate a preview image frame. Hereinafter, for the convenience of description, it is described that a first preview image frame is a preview image frame to which no dynamic tone mapping (or image processing which makes an image similar to an image to which dynamic tone mapping is applied) is applied. Further, it is described that a second preview image frame refers to a preview image frame to which image processing is applied to make an image similar to an image to which dynamic tone mapping is applied or a preview image frame to which dynamic tone mapping is applied. According to various embodiments of the disclosure, the first preview image frame and the second preview image frame may be distinguished from each other according to an image-processing method, and image data or content included in each preview image frame may differ depending on the time point at which the preview image frame is generated. For example, the first preview image frame may be a preview image frame to which image processing is applied according to a first method, and the second preview image frame may be a preview image frame to which image processing is applied according to a second method, which differs from the first method. A second preview image frame for a first preview image corresponding to the same time point may include the same image data or content (e.g., a scene at the time point) as that of the first preview image.

The dynamic tone mapping may be applied in various ways. A description of various embodiments relating thereto will be made later with reference to FIGS. 5A to 7D. According to an embodiment of the disclosure, the dynamic tone mapping may be applied by the processor 220 or a display driver integrated circuit 261 of the display 260.

According to various embodiments of the disclosure, the image signal processor 221 may output (transfer or transmit) a preview image frame and a recorded image frame to the other paths. For example, the image signal processor 221 may output preview image frame 1 (301-1) to preview image frame N (301-N) on the display 260. The image signal processor 221 may output recorded image frame 1 (303-1) to recorded image frame N (303-N) to the memory 230. The image signal processor 221 may transmit, to the memory 230, original image frame 1 (300-1) to original image frame N (300-N) acquired through the image sensor 283 of the camera module 280, as recorded image frame 1 (303-1) to recorded image frame N (303-N), without applying image processing, or may transmit the same to the memory 230 as recorded image frame 1 (303-1) to recorded image frame N (303-N) after applying image processing (e.g., filtering out noise and adjusting the resolution and/or size thereof).

According to an embodiment of the disclosure, at the time of dynamic-tone-mapping-based moving-image recording, the processor 220 may analyze a recorded image frame and generate dynamic-tone-mapping (DTM) metadata based on the result of the analysis. According to an embodiment of the disclosure, the processor 220 may receive the result of analysis of an original image frame or a recorded image frame from the image signal processor 221 and generate dynamic-tone-mapping metadata based on the received result of the analysis. In an embodiment of the disclosure, dynamic-tone-mapping metadata may be as shown in, for example, Table 1.

TABLE 1

| Value (4 bits) | Metadata | Description |
| --- | --- | --- |
| 0 | Minimum/maximum brightness | Minimum/maximum brightness of image |
| 1 | Backlight peaking information | Display back light unit (BLU) luminance mapping parameter |

TABLE 1-continued

| Value (4 bits) | Metadata | Description |
|---|---|---|
| 2 | Color standard | Color gamut & temperature of image |
| 3 | Transfer parameter | Gamma and contrast enhancement (CE) control parameter |
| 4 | Scene information | Scene information such as indoors/outdoors and day/night |
| 5 | Histogram information | Lowest/highest/optimal pixel value information |
| 6 | Sharpness parameter | Information on intensity of edge region of image |
| 7-15 | $N^{th}$-order tone curve anchor | Information relating to dynamic tone curve |

According to various embodiments of the disclosure, the processor 220 may store the generated dynamic-tone-mapping metadata in the memory 230 together with the recorded image frame. The processor 220 may also perform processing (e.g., compression) for the recorded image frame. According to an embodiment of the disclosure, the electronic device 201 may include a separate processor (e.g., the auxiliary processor 123 of FIG. 1) for generating dynamic-tone-mapping metadata.

According to various embodiments of the disclosure, the processor 220 may adjust the brightness of the display 260 during the dynamic-tone-mapping-based moving-image recording. A description of various embodiments relating thereto will be made later with reference to FIGS. 8A and 8B.

According to various embodiments of the disclosure, the display 260 may display an image and/or a moving image. The display 260 may include a display driver integrated circuit (DDI) 261 configured to control the display 260. The DDI 261 may receive, from another component of the electronic device 201, image data or image information including an image control signal corresponding to a command for controlling the image data. For example, the image information may be received from the processor 220. The DDI 261 may store at least part of received image information in buffer memory (not shown) in, for example, units of frames. The DDI 261 may perform pre-processing or post-processing (e.g., adjusting the resolution, the brightness, or the size) for, for example, at least part of image data, based at least on the characteristics of the image data or the characteristics of the display 260. The DDI 261 may generate a voltage value or a current value corresponding to the pre-processed or post-processed image data and drive at least some pixels of the display 260 based at least partially on the voltage value or the current value so as to display visual information (e.g., text, an image, or an icon) corresponding to the image data through the display 260.

According to an embodiment of the disclosure, the display 260 may display, in real time, a preview image corresponding to an image acquired through the camera module 280. For example, in the case of normal recording, the preview image may be an image obtained by converting the acquired image to be suitable for the display. In the case of dynamic-tone-mapping-based recording, the preview image may be an image to which dynamic tone mapping is applied. The dynamic tone mapping may be applied to the preview image in various ways. A description relating thereto will be made later with reference to FIGS. 5A to 7D.

According to various embodiments of the disclosure, the memory 230 may store dynamic-tone-mapping-based moving-image recording data. The moving-image recording data may include a plurality of pieces of dynamic-tone-mapping metadata generated by analyzing a plurality of recorded image frames together and each recorded image frame individually. In an embodiment of the disclosure, the dynamic-tone-mapping metadata may be applied to a first preview image to generate a second preview image. For example, during dynamic-tone-mapping-based moving-image recording, the dynamic-tone-mapping metadata corresponding to a previously generated (e.g., $N-1^{th}$ or $N-2^{th}$) image frame may be applied to an $N^{th}$ preview image frame. A description relating thereto will be made later with reference to FIGS. 7A to 7D.

According to an embodiment of the disclosure, the memory 230 may include at least one piece of preview-processing data applicable to a first preview image frame. For example, the preview-processing data may not be generated by analyzing a recorded image frame or an original image frame acquired through a camera module 280 in real time, but may be stored in the memory 230 at the time of the manufacture of the electronic device 201 or through downloading. The type of the preview-processing data may be at least partially the same as that of the dynamic-tone-mapping metadata. The at least one piece of preview-processing data may be used to generate a second preview image frame. A description relating thereto will be made later with reference to FIGS. 5A to 6F.

In FIG. 2, it is described that the image signal processor 221 is included in the processor 220, but according to an embodiment of the disclosure, the image signal processor 221 may be included in another component (e.g., the camera module 280), or may be a separate component.

According to various embodiments of the disclosure, an electronic device (e.g., the electronic device 101, 201) may comprise a camera module (e.g., the camera module 180, 280), a display (e.g., the display module 160, the display 260), a processor (e.g., the processor 120, 220) operatively connected to the camera module and the display, and a memory (e.g., the memory 130, 230) operatively connected to the processor, wherein the memory stores instructions which, when executed, cause the processor to acquire original image frames through the camera module, display, on the display, first preview image frames corresponding to the acquired original image frames, receive an input for requesting dynamic-tone-mapping-based recording, perform the dynamic-tone-mapping-based recording in response to the receiving of the input, and while performing of the dynamic-tone-mapping-based recording, generate second preview image frames by performing dynamic-tone-mapping processing to first preview image frames acquired after a time point at which the input is received, and display the generated second preview image frames on the display.

According to various embodiments of the disclosure, the memory may store instructions which, when executed, cause the processor to generate a recorded image frame by converting each of the acquired original image frames, analyze each of the acquired original image frames or the recorded image frame, generate dynamic-tone-mapping metadata based on a result of the analyzing, and perform the dynamic-tone-mapping-based recording in which the recorded image frame and the generated dynamic-tone-mapping metadata are stored together in the memory.

According to various embodiments of the disclosure, the memory may comprise instructions which, when executed, cause the processor to apply, to the first preview image frames acquired after the time point at which the input is received, most recently generated dynamic-tone-mapping metadata or one of at least one preview-processing data which is stored in the memory and has a non-linear curve shape, to perform the dynamic-tone-mapping processing.

According to various embodiments of the disclosure, the memory may further store instructions which, when executed, cause the processor to select preview-processing data to be applied to each of the first preview image frames after the time point at which the input is received, based on a selection by a user or image-capturing environment information of the electronic device when a plurality of preview-processing data exist.

According to various embodiments of the disclosure, the memory may further store instructions which, when executed, cause the processor to, when a plurality of preview-processing data exist: analyze each of the first preview image frames after the time point at which the input is received, select one of the plurality of preview-processing data based on a result of the analyzing, and apply the selected preview-processing data to each of the first preview image frames after the time point at which the input is received.

According to various embodiments of the disclosure, the at least one preview-processing data may be added or updated through learning.

According to various embodiments of the disclosure, the memory may further store an instruction which, when executed, causes the processor to control a brightness of the display when the first preview image frames or the generated second preview image frames are displayed.

According to various embodiments of the disclosure, the instruction configured to control the brightness of the display may cause the processor to fix the brightness of the display based on a designated brightness or a designated scale ratio of brightness, analyze each of the first preview image frames and adjust the brightness of the display to a brightness determined based on a result of the analyzing, or adjust the brightness of the display to a brightness determined based on most recently generated first dynamic-tone-mapping metadata.

According to various embodiments of the disclosure, the instruction configured to control the brightness of the display may cause the processor to adjust a brightness of an entire area of the display based on the designated brightness, the designated scale ratio of brightness, or the determined brightness.

According to various embodiments of the disclosure, the instruction configured to control the brightness of the display may cause the processor to divide the display into a plurality of areas and adjust a brightness of each of the areas of the display.

According to various embodiments of the disclosure, an electronic device (e.g., the electronic device 101, 201) may comprise a camera module (e.g., the camera module 180, 280), a display (e.g., the display module 160, the display 260), a processor (e.g., the processor 120, 220) operatively connected to the camera module and the display, and a memory (e.g., the memory 130, 230) operatively connected to the processor, wherein the memory stores instructions which, when executed, cause the processor to display, on the display, preview image frames corresponding to original image frames acquired through the camera module, and in response to reception of a first user input enabling a function of dynamic-tone-mapping-based recording or a second user input for requesting the dynamic-tone-mapping-based recording, adjust a brightness of the display based on at least one of a designated brightness, a designated scale ratio of brightness, static-tone-mapping information, or a result of analysis of a preview image frame after a time point at which the first user input is received.

According to various embodiments of the disclosure, the memory may further store an instruction which, when executed, causes the processor to perform the dynamic-tone-mapping-based recording in response to the reception of the second user input. The instruction configured to control the brightness of the display may cause the processor to maintain the adjusted brightness or readjust the brightness of the display based on most recently generated dynamic-tone-mapping metadata with reference to a current preview image frame while performing the dynamic-tone-mapping-based recording.

Figure 4:
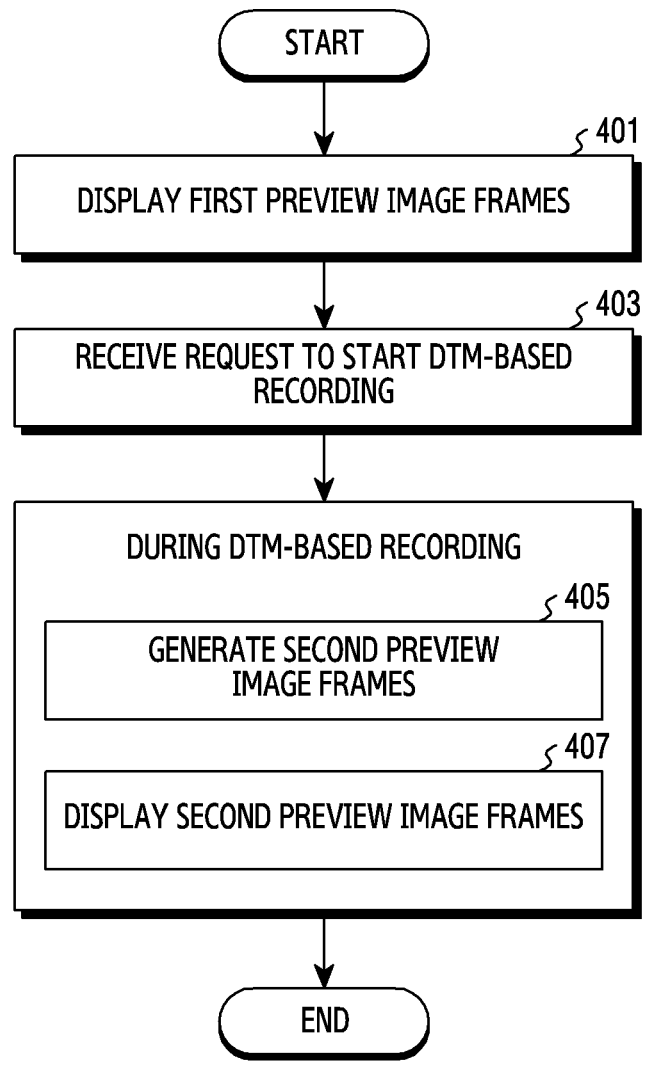
FIG. 4 is a flowchart illustrating a method for providing a preview during dynamic-tone-mapping-based moving-image recording by an electronic device according to an embodiment of the disclosure.

FIG. 4 is a flowchart illustrating a method for providing a preview during dynamic-tone-mapping-based moving-image recording by an electronic device according to an embodiment of the disclosure.

Referring to FIG. 4, in operation 401, a processor (e.g., the processor 120 of FIG. 1 or the processor 220 of FIG. 2) of an electronic device (e.g., the electronic device 101 of FIG. 1 or the electronic device 201 of FIG. 2) according to an embodiment may control a display (e.g., the display device 160 of FIG. 1 or the display 260 of FIG. 2) to display first preview image frames. For example, when a camera function is activated (e.g., when a camera application is executed), the processor may display, on a display, a first preview image frame corresponding to an original image frame acquired through a camera module (e.g., the camera module 180 of FIG. 1 or the camera module 280 of FIG. 2). For example, the first preview image frame may be generated to be suitable for the display specifications by converting (e.g., adjusting the resolution and/or size of), by the processor, an original image frame acquired through a camera module. According to an embodiment of the disclosure, the conversion may be performed by an image signal processor (e.g., the image signal processor 221 of FIG. 2).

According to an embodiment of the disclosure, in operation 403, a request to start dynamic-tone-mapping (DTM)-based recording may be received. For example, the request may be received through a touch input on a soft menu (e.g., a recording button 651 of FIG. 6E) displayed on one side of the display, entry to a menu item to which dynamic-tone-mapping (DTM)-based recording is designated, or an input on a designated physical key. However, a person skilled in the art can easily understand that this is not limiting. For example, various inputs received through the input device 150 (e.g., a microphone, a mouse, a keyboard, or a digital pen) of FIG. 1 may also be included.

According to an embodiment of the disclosure, in response to the input, the processor may perform dynamic-tone-mapping-based recording. For example, the processor may store an original image frame (or may convert an original image frame and store the converted original image frame) as a recorded image frame. In another example, the processor may analyze an original image frame or a recorded image frame and generate dynamic-tone-mapping metadata based on a result of the analysis. According to an embodiment of the disclosure, the image signal processor may analyze an original image frame or a recorded image frame, and the processor may receive the result of the analysis of the original image frame or the recorded image frame from the image signal processor and generate dynamic-tone-mapping metadata based on the received result of the analysis.

According to an embodiment of the disclosure, in operation 405, during dynamic-tone-mapping-based recording, the processor may generate a second preview image frame.

For example, the second preview image frame may be generated by applying image processing (e.g., dynamic-tone-mapping processing) to the first preview image frame. For example, the dynamic-tone-mapping processing may be image processing which makes an image similar to an image to which dynamic tone mapping is applied, or may be application of dynamic tone mapping. At least a part of the second preview image frame may be different from the first preview image frame in at least some of color, tone, and/or brightness.

According to various embodiments of the disclosure, the second preview image frame may be generated in various ways. According to an embodiment of the disclosure, the processor may generate a second preview image frame by applying basic preview-processing data (referred to as "default dynamic-tone-mapping metadata"), designated by a manufacturer or a user of the electronic device, to the first preview image frame. Here, the same default dynamic-tone-mapping metadata may be applied to first preview image frames that are consecutively received. Various embodiments relating thereto will be described later with reference to FIGS. 5A to 5D.

According to another embodiment of the disclosure, the processor may generate a second preview image frame by applying static-tone-mapping information (e.g., static-tone-mapping metadata) to a first preview image frame. According to the standard of a dynamic-tone-mapping file, a dynamic-tone-mapping-based recording image (file) may include static-tone-mapping information including information related to a display color volume, a white point, and luminance at the time of mastering. For example, the static-tone-mapping information may be included in a first sequence of a dynamic-tone-mapping file. When the dynamic-tone-mapping-based recording is requested, the processor may apply static tone mapping (e.g., static-tone-mapping processing) to a first preview image frame based on static-tone-mapping information included in a dynamic-tone-mapping-based recording image (file) so as to generate a second preview image frame. Accordingly, an electronic device according to an embodiment may provide a further enhanced preview image (e.g., a preview image having increased or decreased brightness or increased sharpness) compared to a preview image at the time of normal standard dynamic range (SDR) recording.

According to another embodiment of the disclosure, the processor may analyze a first preview image frame, select one piece of preview-processing data from among a plurality of pieces of preview-processing data (also referred to as "dynamic-tone-mapping metadata") stored in the memory 230 at the time of manufacture of the electronic device 201 or through downloading, based on a result of the analysis, and apply the selected preview-processing data to a corresponding first preview image frame so as to generate a second preview image frame. Various embodiments relating thereto will be described later with reference to FIGS. 6A to 6F.

According to another embodiment of the disclosure, during dynamic-tone-mapping-based recording, the processor may apply dynamic-tone-mapping metadata generated by analyzing an original image frame or a recorded image frame, to a first preview image frame so as to generate a second preview image frame. In an embodiment of the disclosure, dynamic-tone-mapping metadata to be applied to the first preview image frame may be dynamic-tone-mapping metadata that is most recently generated during performing of dynamic-tone-mapping-based recording. For example, the processor may apply, to an $N^{th}$ first preview image frame, $N-1^{th}$ or $N-2^{th}$ dynamic-tone-mapping metadata generated by analyzing an $N-1^{th}$ or $N-2^{th}$ original image frame or an $N-1^{th}$ or $N-2^{th}$ recorded image frame. This is because there is a high possibility that the current image frame and the preview image frame are similar Various embodiments relating thereto will be described later with reference to FIGS. 7A to 7D.

According to an embodiment of the disclosure, in operation 405, the second preview image frame may be generated by a display driver integrated circuit (e.g., the DDI 261). For example, the display driver integrated circuit may receive a first preview image frame from the processor (or the image signal processor) and apply image processing (e.g., dynamic-tone-mapping processing) according to the various above-described methods to the first preview image frame so as to generate a second preview image frame.

According to an embodiment of the disclosure, in operation 407, during dynamic-tone-mapping (DTM)-based recording, the second preview image frames generated in operation 405 may be displayed using a display.

According to various embodiments of the disclosure, although not shown in FIG. 4, when a dynamic-tone-mapping-based recording function (or a dynamic-tone-mapping-based recording mode) is enabled (or activated) or when dynamic-tone-mapping-based recording is requested, the processor may control the brightness of a display that displays a preview image frame. For example, the processor may fix the brightness of the display based on a designated brightness or a designated scale ratio of brightness. For example, the processor may fix the brightness of the display to a designated brightness that is brighter than the brightness of a preview at the time of normal standard dynamic range (SDR) recording, or may adjust (e.g., increase) the brightness of the display to be brighter by multiplying current brightness by the designated scale ratio of brightness (for example, a value greater than 1.0). The above-described two ways of controlling the brightness of the display require no additional analysis of a first preview image frame or a recorded image frame, and may thus be directly applied to a first preview image when a dynamic-tone-mapping-based recording operation is detected.

In another example, the processor may change the brightness of a display according to the characteristics of a preview image frame, or may change (or adjust) the brightness of a display based on most recently generated dynamic-tone-mapping metadata with reference to a current preview image frame. In another example, the processor may change (or adjust) the brightness of a display based on static-tone-mapping information. A description relating thereto will be made later with reference to FIGS. 8A and 8B. According to an embodiment of the disclosure, the processor may make the entire display have the same brightness, or may make the display have different brightness in some regions thereof.

In FIG. 4, for the convenience of description, it is described that various embodiments are applied in units of frames, but this is merely an example, and does not limit various embodiments of the disclosure. For example, various embodiments may be applied in units of scenes. Here, each scene may be a set of frames having characteristics (e.g., brightness or color) of image data, which do not greatly change across respective frames. For example, when an image of the beach is captured for a predetermined time and then an image of a mountain is captured, the change in brightness exceeds a designated threshold, and thus each scene may be distinguished. In this case, each of an interval (including multiple frames) in which the image of the beach is captured and an interval (including multiple frames) in which the image of the mountain is captured may constitute one scene.

Figure 5A:
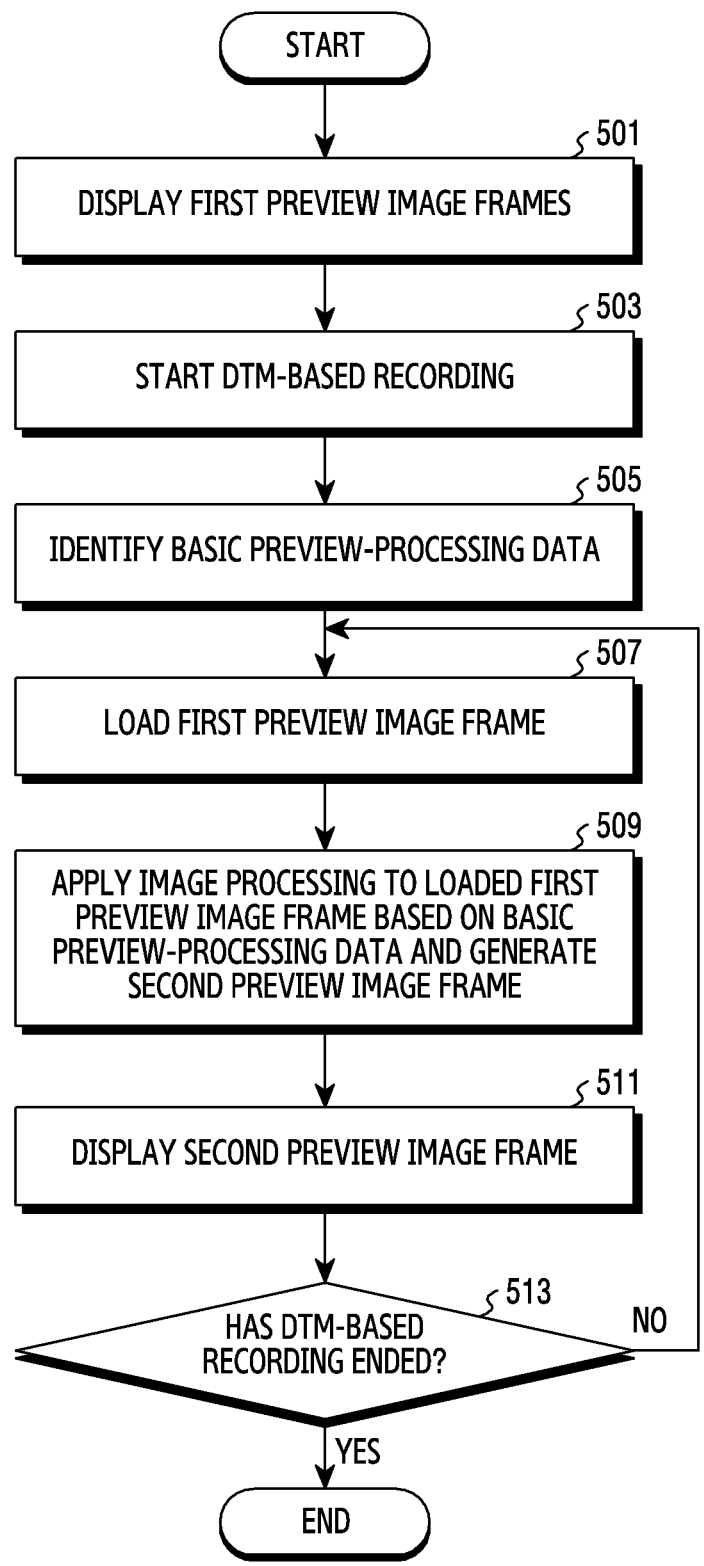
FIG. 5A is a flowchart illustrating a method for providing a preview using preview-processing data by an electronic device according to an embodiment of the disclosure.
Figure 5B:
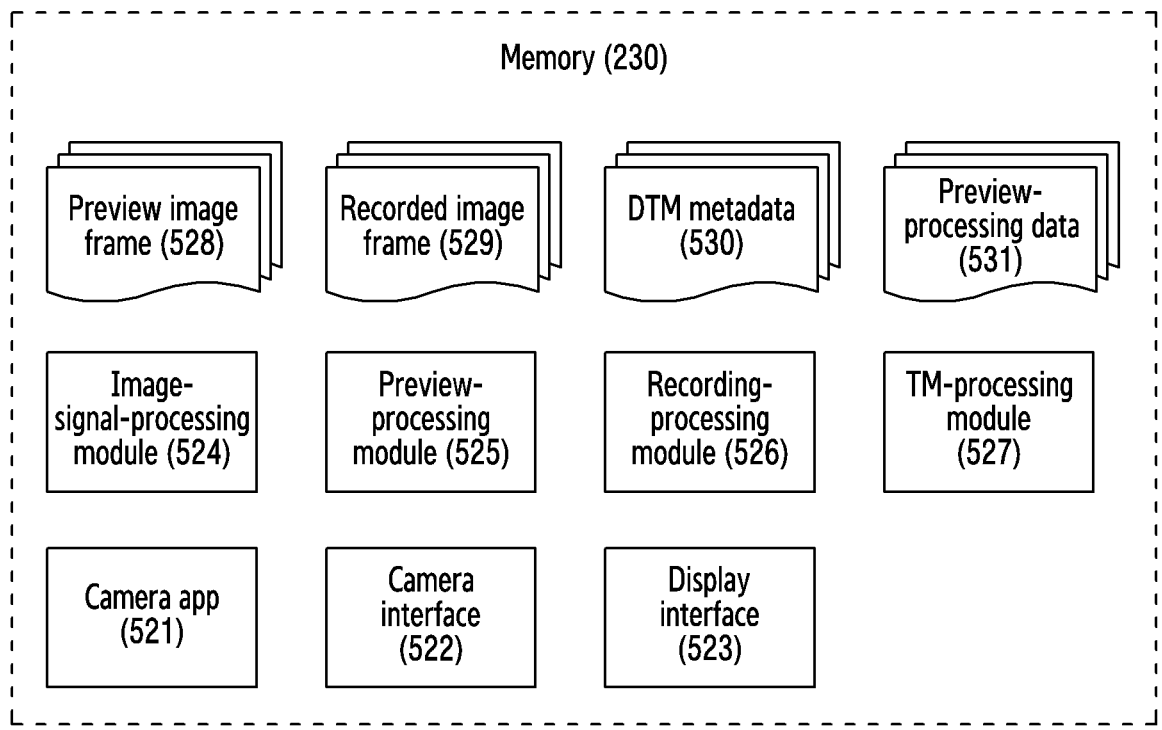
FIG. 5B illustrates a configuration of memory according to an embodiment of the disclosure.
Figure 5C:
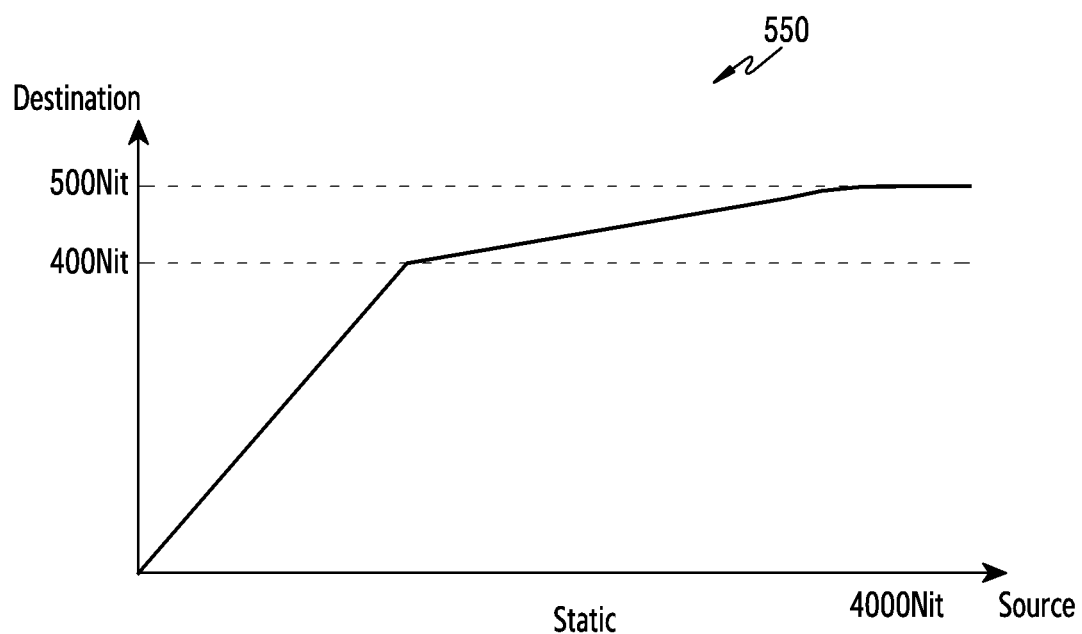
FIG. 5C is a graph showing a tone-mapping curve of preview-processing data according to an embodiment of the disclosure.
Figure 5C:
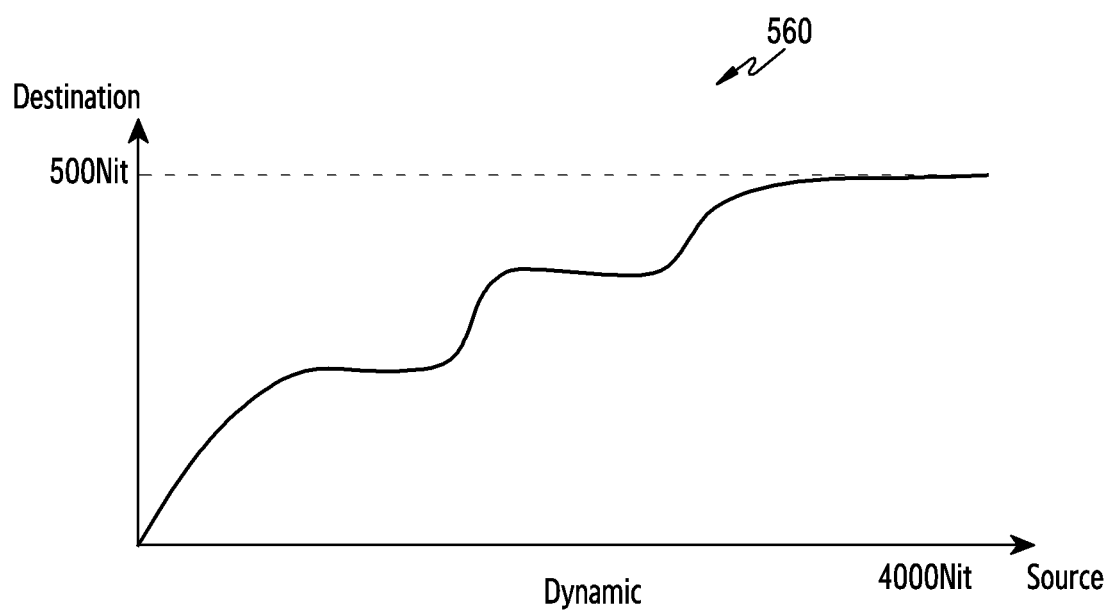
Figure 5D:
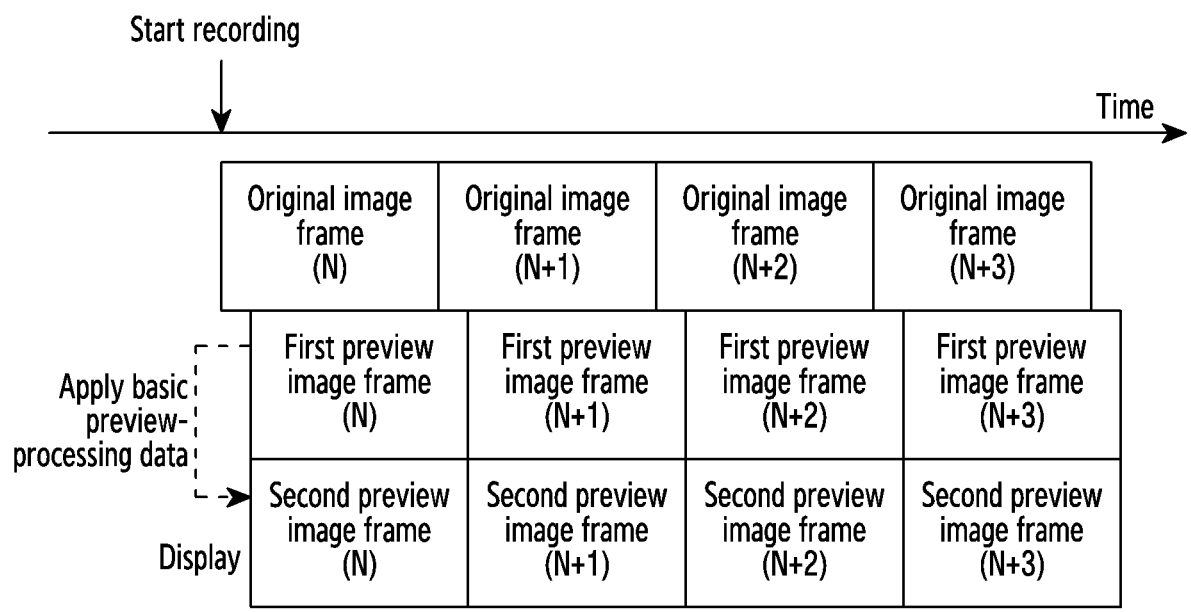
FIG. 5D illustrates a pipeline of image frames according to an embodiment of the disclosure.

FIG. 5A is a flowchart illustrating a method for providing a preview using preview-processing data by an electronic device according to an embodiment of the disclosure, FIG. 5B illustrates a configuration of memory according to an embodiment of the disclosure, FIG. 5C is a graph showing a tone-mapping curve of preview-processing data according to an embodiment of the disclosure, and FIG. 5D illustrates a pipeline of image frames according to an embodiment of the disclosure.

Referring to FIGS. 5A, 5B, 5C, and 5D, in operation 501, a processor (e.g., the processor 120 of FIG. 1 or the processor 220 of FIG. 2) of an electronic device (e.g., the electronic device 101 of FIG. 1 or the electronic device 201 of FIG. 2) according to an embodiment may control a display (e.g., the display device 160 of FIG. 1 or the display 260 of FIG. 2) to display first preview image frames. For example, referring to FIG. 5B, when a camera app 521 is executed, the processor may control an image-signal-processing module 524 to receive original image frames from a camera module (e.g., the camera module 180 of FIG. 1 or the camera module 280 of FIG. 2) through a camera interface 522 and to transmit the received original image frames to a preview-processing module 525. The processor may control the preview-processing module 525 to generate first preview image frames by converting (or applying image processing to) (e.g., filtering out noise from or adjusting the resolution and/or size of) original image frames to make the original image frames suitable for the display specifications and store the generated first preview image frames in a partial area (e.g., volatile memory 132) of the memory 230 or buffer memory (not shown) included in the display as preview image frames 528. The display may load the preview image frames 528 through a display interface 523 and display the first preview image frames. According to an embodiment of the disclosure, the preview-processing module 525 may also be included in the image-signal-processing module 524.

According to an embodiment of the disclosure, the image-signal-processing module 524 may be included in another hardware element (e.g., a processor or a camera module), or may be implemented as hardware (e.g., an image signal processor (ISP)) included in an electronic device as a separate element, or the preview-processing module 525 may also be included in another hardware element (e.g., a processor or a camera module), or may be implemented as hardware (e.g., a multi-scaler) included in an electronic device as a separate element. According to an embodiment of the disclosure, the multi-scaler may be included in the image signal processor.

According to an embodiment of the disclosure, in operation 503, the processor may start dynamic-tone-mapping (DTM)-based recording. For example, the processor may start dynamic-tone-mapping-based recording upon receipt of a touch input on a soft menu (e.g., a recording button 651 of FIG. 6E) displayed on one side of the display or an input on a designated physical key. Referring to FIG. 5B, the processor may control a recording-processing module 526 to generate recorded image frames 529 by converting (or applying image processing to) (e.g., adjusting the resolution and/or size of) original image frames to make the original image frames suitable for the recording specification and store the generated recorded image frames 529 in another partial area (e.g., volatile memory 132 or non-volatile memory 134) of the memory 230. According to an embodiment of the disclosure, the recording-processing module 526 may store an original image frame as a recorded image frame 529 without conversion of the original image frame. The processor may control the recording-processing module 526 to analyze the recorded image frame 529, generate dynamic-tone-mapping metadata 530 based on a result of the analysis, and store the generated dynamic-tone-mapping metadata 530 in another partial area of the memory 230. The dynamic-tone-mapping metadata 530 may be linked (or mapped) to the recorded image frame 529 and stored. According to an embodiment of the disclosure, the recording-processing module 526 may receive a result of analysis of an original image frame from the image-signal-processing module 524, generate dynamic-tone-mapping metadata 530 based on the received result of the analysis, and store the generated dynamic-tone-mapping metadata 530. According to an embodiment of the disclosure, the recording-processing module 526 may analyze a first preview image frame at the same time as, or in the time preceding, the recorded image frame 529, and generate dynamic-tone-mapping metadata 530.

According to an embodiment of the disclosure, the recording-processing module 526 may be included in the image-signal-processing module 524. FIG. 5B illustrates that the recording-processing module 526 is software executed by a processor, but the recording-processing module 526 may be included in another hardware element (e.g., a processor, an image signal processor, or a camera module), or may be implemented as hardware (e.g., a multi-scaler) included in an electronic device as a separate element. According to an embodiment of the disclosure, the multi-scaler may support a preview-processing function (module) and a recording processing function (module).

According to an embodiment of the disclosure, in operation 505, the processor may identify basic preview-processing data. For example, the type of the basic preview-processing data may be at least partially the same as that of dynamic-tone-mapping metadata. In another example, the basic preview-processing data may be referred to as "default dynamic-tone-mapping metadata". In an embodiment of the disclosure, the identified basic preview-processing data may be loaded in memory and used to apply image processing to a first preview image frame during dynamic-tone-mapping-based moving-image recording. For example, referring to FIG. 5B, the processor may control a tone mapping (TM) processing module 527 to load the basic preview-processing data from the memory 230.

According to an embodiment of the disclosure, the same basic preview-processing data may be applied to first preview image frames generated while performing the dynamic-tone-mapping-based moving-image recording. In an embodiment of the disclosure, a tone-mapping curve of the basic preview-processing data may be of a different type from a tone-mapping curve for ultra-high definition alliance (UHDA) certification according to a comparative example. For example, referring to FIG. 5C, the tone-mapping curve for ultra-high definition alliance (UHDA) certification according to a comparative example may have a linear shape, as shown in the graph with reference numeral 550. On the other hand, according to various embodiments of the disclosure, the tone-mapping curve of the basic preview-processing data may have a non-linear curve shape, as shown in the graph with reference numeral 560. Accordingly, the tone-mapping curve of the basic preview-processing data may have high degrees of freedom. In the tone-mapping curve graphs of FIG. 5C, the X-axis (source) indicates a brightness value (nit) of an original image and the Y-axis (destination) indicates a brightness value to be displayed on the display. For example, referring to the graphs in FIG. 5C, a part having a brightness value of about 4000 nit in the original image is displayed to have a brightness value of 500 nit, and parts that have brightness values lower than 4000 nit may be displayed to have various brightness values according to a tone-mapping curve.

According to an embodiment of the disclosure, one or more pieces of basic preview-processing data may exist. For example, the memory 230 may include a plurality of pieces of preview-processing data 531, each of which has a combination of different colors, tones, and/or brightness. The preview-processing data 531 may be stored as shown in Table 2 below.

TABLE 2

| Index | Color | Tone |
|---|---|---|
| First preview-processing data | Vibrance 10 Saturation 15 | Gamma 0.79 Exposure 0.5 Shadow 27 Highlight −10 |
| Second preview-processing data | Vibrance −10 Saturation 15 | Gamma 0.40 Exposure 1.5 Shadow 15 Highlight −8 |

In an embodiment of the disclosure, the preview-processing data 531 may be provided (or stored) by a manufacturer at the time of manufacture of the electronic device, and may be updated. In another example, the preview-processing data 531 may be downloaded and stored by a user. According to an embodiment of the disclosure, the preview-processing data 531 may be generated or updated using an average value of tone-mapping curves used at the time of the previous dynamic-tone-mapping-based recording. Meanwhile, the preview-processing data 531 in Table 2 is a mere example and does not limit embodiments of the disclosure. For example, the preview-processing data 531 may be at least partially the same as that in Table 1 or may include more elements, or some of the color, tone, and/or brightness may not be included in the preview-processing data 531.

According to an embodiment of the disclosure, when a plurality of pieces of preview-processing data 531 is included, the processor may identify (or determine) one of the plurality of pieces of preview-processing data 531 as basic preview-processing data according to a user input. For example, when a request for dynamic-tone-mapping-based recording is detected, the processor may display a list of pieces of preview-processing data 531 and identify basic preview-processing data based on a selection by a user. According to an embodiment of the disclosure, the processor may identify one of the plurality of pieces of preview-processing data 531 as basic preview-processing data based on image-capturing environment information. The image-capturing environment information may be acquired by at least one sensor (e.g., the sensor module 176 of FIG. 1). For example, the image-capturing environment information may include sensing information (e.g., a dark or bright environment, or a dynamic environment in which an electronic device moves quickly) acquired by an illuminance sensor and/or a motion sensor. According to an embodiment of the disclosure, when the image-capturing environment information is changed, the processor may re-identify one of the plurality of pieces of preview-processing data 531 as basic preview-processing data based on the changed image-capturing environment information.

According to an embodiment of the disclosure, in operation 507, the processor may load a first preview image frame. For example, the processor may control the tone-mapping processing module 527 to load a first preview image frame from the memory 230. According to various embodiments of the disclosure, a person skilled in the art can easily understand that the first preview image frame loaded in operation 507 is loaded at a later time (e.g., a start time of a DTM-based recording) than first preview image frames displayed in operation 501, and the first preview image frame loaded in operation 507 and the first preview image frames displayed in operation 501 may include different image data or content from each other. For example, referring to FIG. 5D, the first preview image frame loaded in operation 507 may be an $N^{th}$ preview image frame corresponding to an $N^{th}$ original image frame, and the first preview image frames displayed in operation 501 may be first preview image frames corresponding to original image frames preceding the $N^{th}$ preview image frame (e.g., original image frames acquired through the camera module before DTM-based recording starts since a camera module is activated).

According to an embodiment of the disclosure, in operation 509, the processor may apply image processing (e.g., image processing which makes an image similar to an image to which dynamic tone mapping is applied) to the first preview image frame based on the identified basic preview-processing data so as to generate a second preview image frame. For example, referring to FIG. 5B, the processor may control the tone-mapping processing module 527 to apply the identified basic preview-processing data to the loaded first preview image frame and generate a second preview image frame.

According to an embodiment of the disclosure, in operation 511, the processor may perform control to display the generated second preview image frame on the display. For example, the processor may control the tone-mapping processing module 527 to transmit the generated second preview image frame to a display driver integrated circuit (DDI) through the display interface 523 and display the same on the display. According to an embodiment of the disclosure, the tone-mapping processing module 527 may store the generated second preview image frame as a preview image frame 528. The display may load the preview image frame 528 through the display interface 523 and display the second preview image frame.

According to an embodiment of the disclosure, the tone-mapping processing module 527 may be included in the image-signal-processing module 524. Meanwhile, in FIG. 5B, it is illustrated that the tone-mapping processing module 527 is software, but the tone-mapping processing module 527 may be included in another hardware element (e.g., a processor, an image signal processor, or a display driver integrated circuit (e.g., the DDI 261)), or may be implemented as hardware included in an electronic device as a separate element.

According to an embodiment of the disclosure, in operation 513, the processor may identify whether the dynamic-tone-mapping-based moving-image recording has ended. When it is identified in operation 513 that the dynamic-tone-mapping-based moving-image recording has not ended, the processor may return to operation 507 and repeat operations 507 to 513.

On the other hand, according to an embodiment of the disclosure, when it is identified in operation 513 that the dynamic-tone-mapping-based moving-image recording has ended, the processor may terminate display of the dynamic-tone-mapping-based second preview image frame.

According to an embodiment of the disclosure, as shown in FIG. 5D, the electronic device may apply basic preview-processing data to a first preview image frame obtained by converting an original image frame so as to generate and display a second preview image frame in real time. Meanwhile, it is illustrated in FIG. 5D that the second preview image frame is generated and displayed as soon as the first preview image frame is generated, but the second preview image frame may be generated and displayed after a predetermined time (e.g., an image-processing time according to application of basic preview-processing data). The predetermined time may be, for example, a very short time and have a value recognizable by a user as a preview image is displayed in real time.

Figure 6A:
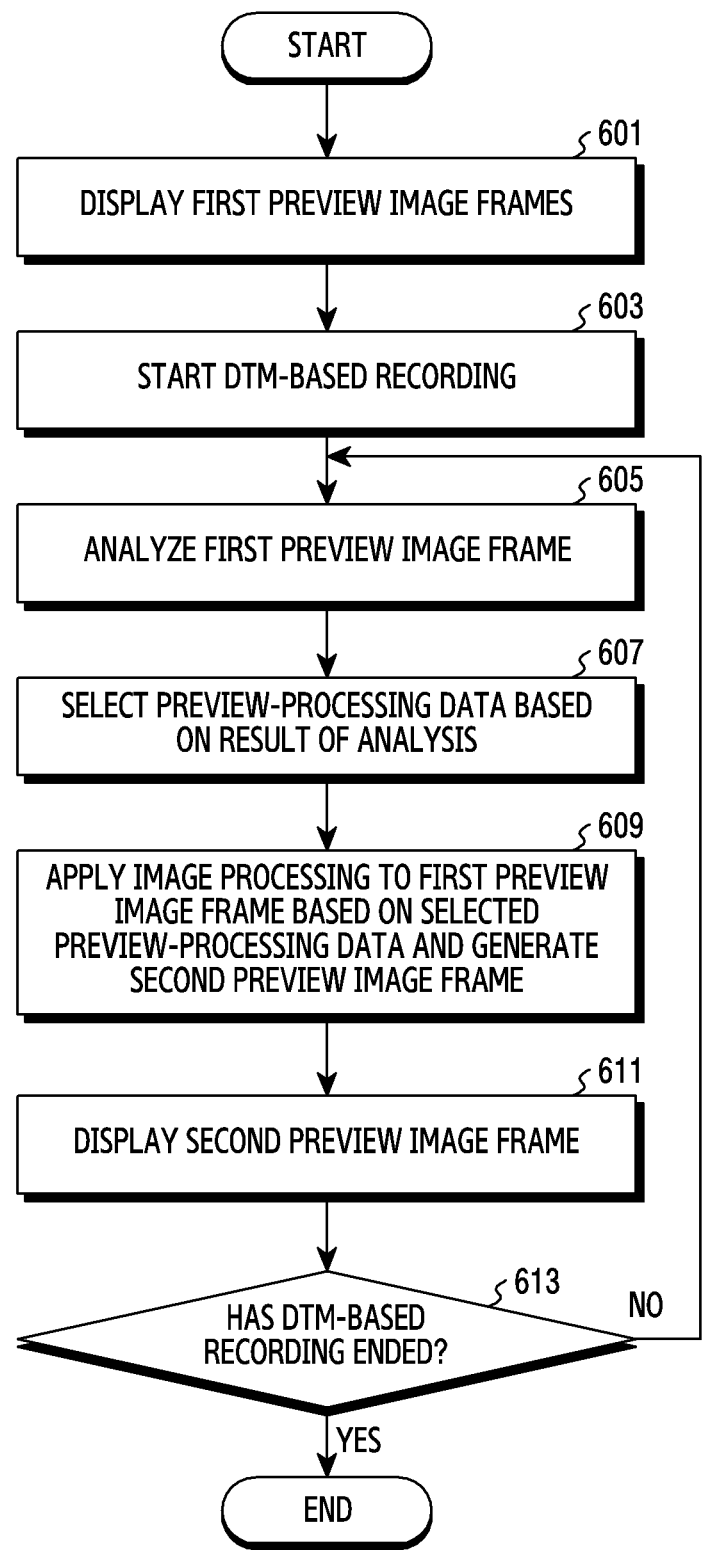
FIG. 6A is a flowchart illustrating a method for providing a preview using preview-processing data by an electronic device according to an embodiment of the disclosure.
Figure 6B:
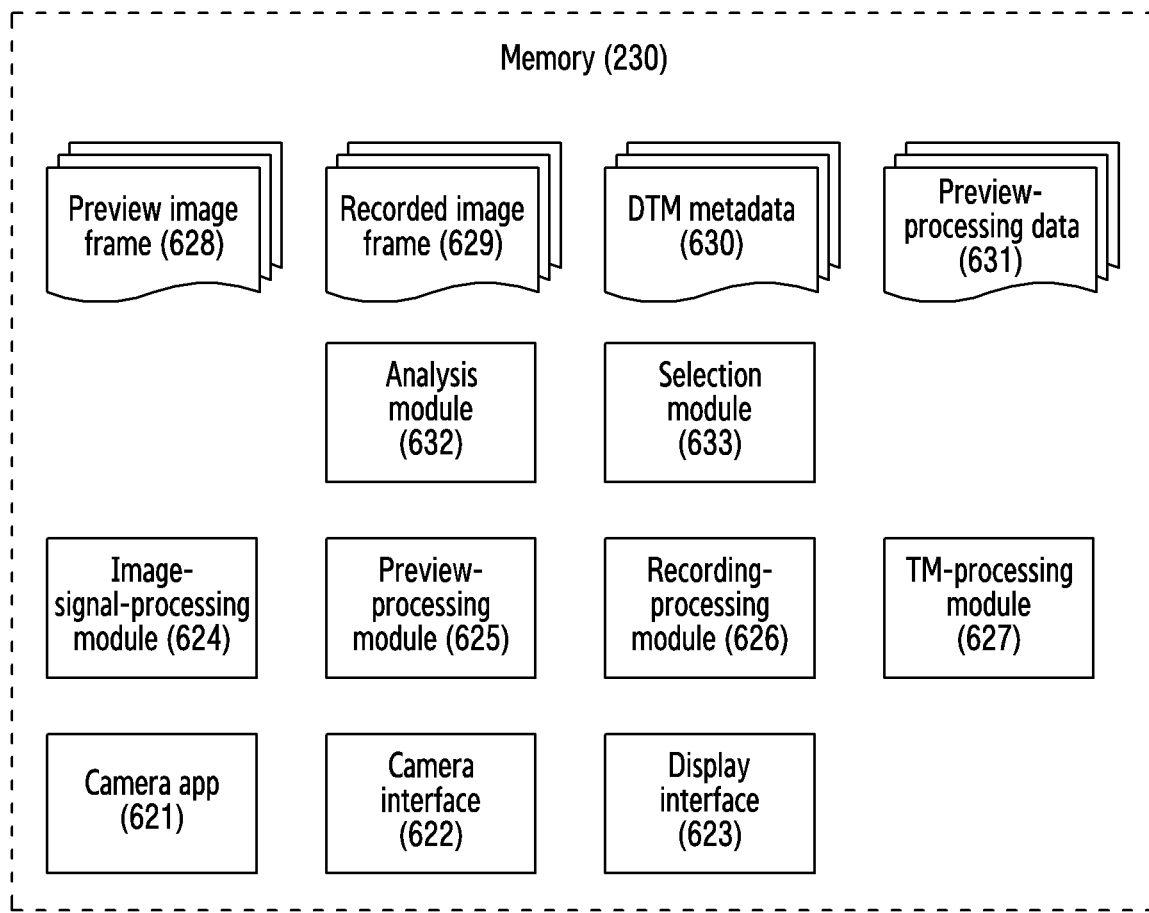
FIG. 6B illustrates a configuration of memory according to an embodiment of the disclosure.
Figure 6C:
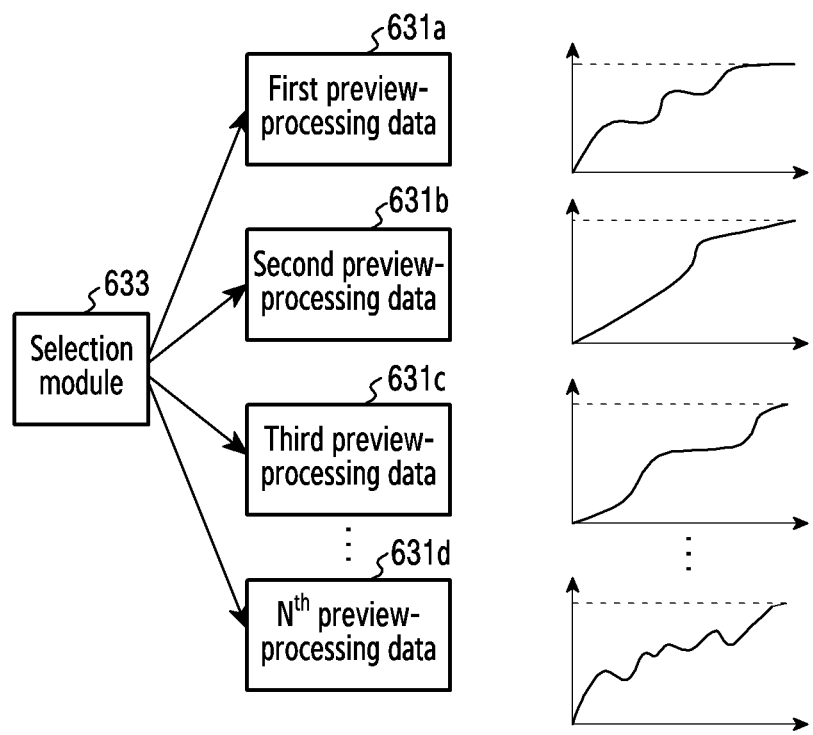
FIG. 6C illustrates an operation of selecting preview-processing data according to an embodiment of the disclosure.
Figure 6D:
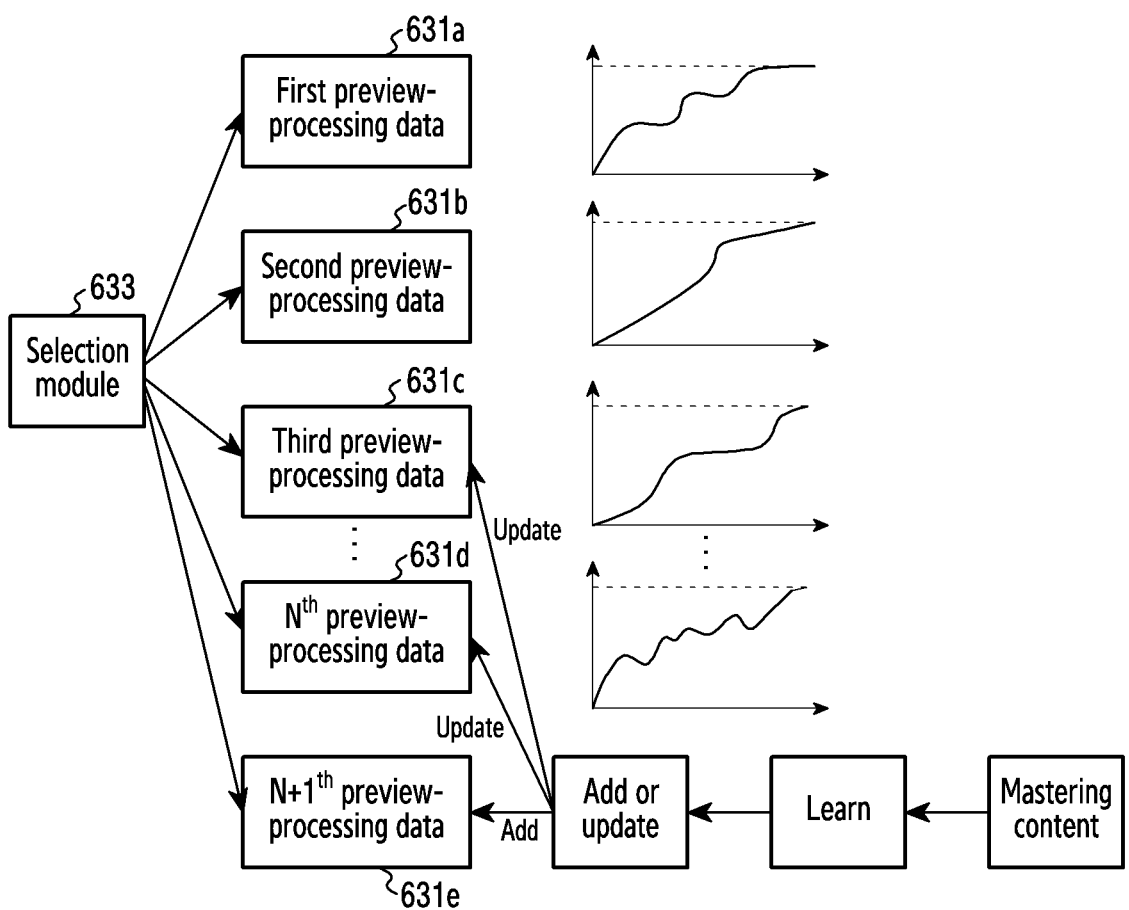
FIG. 6D illustrates addition and update of preview-processing data according to an embodiment of the disclosure.
Figure 6E:
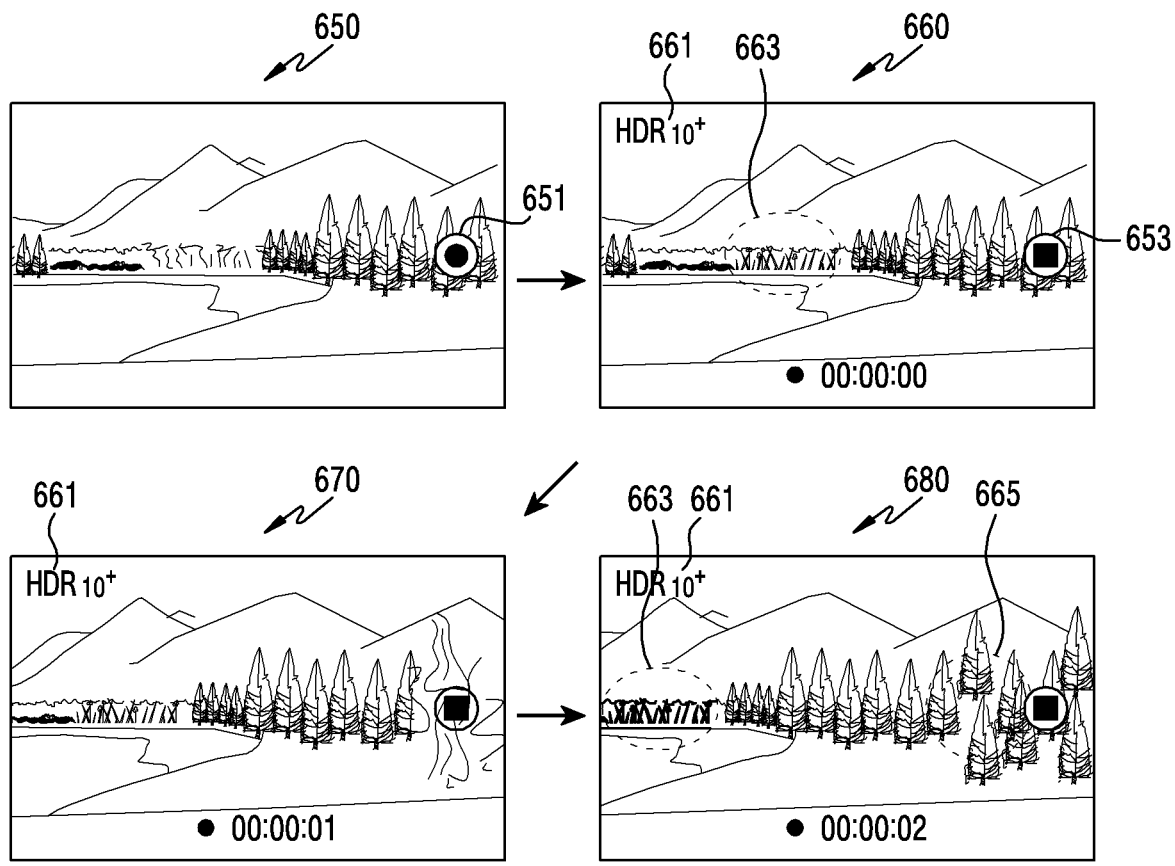
FIG. 6E illustrates a method for providing a preview using preview-processing data by an electronic device according to an embodiment of the disclosure.
Figure 6F:
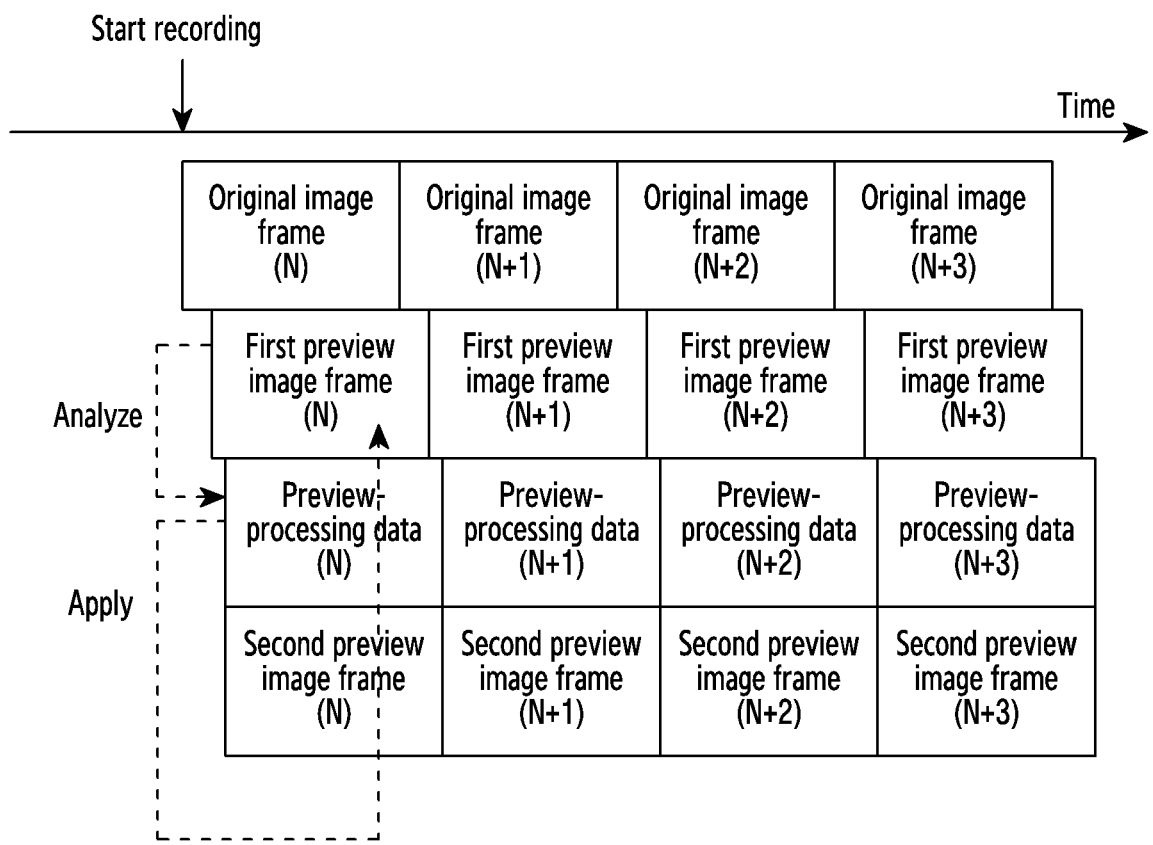
FIG. 6F illustrates a pipeline of image frames according to an embodiment of the disclosure.

FIG. 6A is a flowchart illustrating a method for providing a preview using preview-processing data by an electronic device according to an embodiment of the disclosure, FIG. 6B illustrates a configuration of memory according to an embodiment of the disclosure, FIG. 6C illustrates selecting preview-processing data according to an embodiment of the disclosure, FIG. 6D illustrates addition and update of preview-processing data according to an embodiment of the disclosure, FIG. 6E illustrates a method for providing a preview using preview-processing data by an electronic device according to an embodiment of the disclosure, and FIG. 6F illustrates a pipeline of image frames according to an embodiment of the disclosure.

Referring to FIGS. 6A, 6B, 6C, 6D, 6E, and 6F, in operation 601, a processor (e.g., the processor 120 of FIG. 1 or the processor 220 of FIG. 2) of an electronic device (e.g., the electronic device 101 of FIG. 1 or the electronic device 201 of FIG. 2) according to an embodiment may control a display (e.g., the display device 160 of FIG. 1 or the display 260 of FIG. 2) to display first preview image frames. Referring to FIG. 6B, when a camera app 621 is executed, the processor may control an image-signal-processing module 624 to receive original image frames from a camera module (e.g., the camera module 180 of FIG. 1 or the camera module 280 of FIG. 2) through a camera interface 622 and to transmit the received original image frames to a preview-processing module 625, and may control the preview-processing module 625 to generate first preview image frames by converting the original image frames to make the original image frames suitable for the display specifications and store the generated first preview image frames as preview image frames 628. The display may load the preview image frames 628 through a display interface 623 to display the first preview image frames. For example, as shown in the drawing of reference numeral 650 of FIG. 6E, the display may display a first preview image frame. The display may display a recording button 651 on one area of the first preview image frame.

According to an embodiment of the disclosure, as the image-signal-processing module 524 and/or the preview-processing module 525 of FIG. 5B, the image-signal-processing module 624 and/or the preview-processing module 625 may be implemented as hardware.

According to an embodiment of the disclosure, in operation 603, the processor may start dynamic-tone-mapping (DTM)-based recording. For example, as shown in the drawing of reference numeral 650 of FIG. 6E, the processor may start dynamic-tone-mapping-based recording upon receipt of a touch input on a recording button 651 displayed on one side of the display. According to an embodiment of the disclosure, the processor may start dynamic-tone-mapping-based recording upon receipt of an input on a designated physical key. Operations 601 and 603 may be similar to operations 501 and 503 described above. For example, when the dynamic-tone-mapping-based recording starts, the processor may control a recording-processing module 626 to generate and store a recorded image frame 629 and dynamic-tone-mapping metadata 630.

According to an embodiment of the disclosure, in operation 605, the processor may analyze a first preview image frame. For example, referring to FIG. 6B, the processor may control an analysis module 632 to load a first preview image frame (including image data different from the first preview image data displayed in operation 601) of a start time point of a DTM-based recording and analyze the loaded first preview image frame. For example, the analysis module 632 may analyze the first preview image frame through differential pulse code modulation (DPCM) image analysis, in which only a differential value between neighboring pixels is represented. According to an embodiment of the disclosure, the analysis module 632 may analyze a first preview image frame using at least one of well-known technologies (e.g., feature point analysis, edge analysis, or frequency-domain analysis for the first preview image frame) in the image analysis field, but the analysis method thereof is not limited. According to an embodiment of the disclosure, the analysis module 632 may perform analysis using a partial area (e.g., a partial area with reference to the center) of a first preview image frame or a sub-sampled first preview image frame. Accordingly, the time required for analysis can be reduced. According to an embodiment of the disclosure, the analysis module 632 may be included in a tone-mapping processing module 627. FIG. 6B illustrates that the analysis module 632 is software, but according to an embodiment of the disclosure, the analysis module 632 may be included in another hardware element (e.g., a processor, an image signal processor, or a tone-mapping processor), or may be implemented as hardware included in an electronic device as a separate element.

According to an embodiment of the disclosure, in operation 607, the processor may select one piece of preview-processing data 631 based on a result of the analysis. As shown in FIG. 6C, the processor may control a selection module 633 to select preview-processing data to be applied to a first preview image frame, among a plurality of pieces of preview-processing data 631a, 631b, 631c, and 631d, based on the result of the analysis. According to various embodiments of the disclosure, the plurality of pieces of preview-processing data may be stored by a manufacturer or downloaded by a user. According to an embodiment of the disclosure, the plurality of pieces of preview-processing data may be generated by extraction of a feature point and/or dynamic-tone-mapping metadata from pieces of image data which are mastered (or post-processed) by professionals in a film company or a studio.

According to various embodiments of the disclosure, each of the plurality of pieces of preview-processing data may be mapped to a value corresponding to a feature point and stored. The value corresponding to a feature point may be a value of an image itself in a database or may be one of values obtained by applying, to an image, the above-described methods for analyzing or capable of analyzing a preview image frame. The selection module 633 may compare a feature point of the first preview image frame with a feature point mapped to each piece of preview-processing data and select preview-processing data (e.g., tone-mapping curve data) having the most similar feature point, based on a result of the analysis. As shown in FIG. 6C, each preview-processing data, for example, may be represented in a tone-mapping curve graph or a curve having another shape.

According to an embodiment of the disclosure, the processor according to an embodiment may add new preview-processing data or update at least part of stored preview-processing data. For example, as shown in FIG. 6D, the processor may perform learning based on a mastering content to add N+1$^{th}$ preview-processing data 631$e$ based on the result of the learning or to update third preview-processing data 631$c$ and N$^{th}$ preview-processing data 631$d$. The processor may update a feature point and a tone-mapping curve as a pair to update preview-processing data.

According to an embodiment of the disclosure, the selection module 633 may be included in the analysis module 632 or the tone-mapping processing module 627. FIG. 6B illustrates that the selection module 633 is software, but according to an embodiment of the disclosure, the selection module 633 may be included in another hardware element (e.g., a processor, an image signal processor, or a tone-mapping processor), or may be implemented as hardware included in an electronic device as a separate element.

According to an embodiment of the disclosure, in operation 609, the processor may apply image processing (e.g., may apply image processing which makes an image similar to an image to which dynamic tone mapping is applied) to the first preview image frame based on the selected preview-processing data and generate a second preview image frame. For example, referring to FIG. 6B, the processor may control the tone-mapping processing module 627 to apply the selected basic preview-processing data to the first preview image frame so as to generate a second preview image frame. According to an embodiment of the disclosure, similar to the tone-mapping processing module 527 of FIG. 5B, the tone-mapping processing module 627 may be included in the image-signal-processing module 624, or may be implemented as hardware.

According to an embodiment of the disclosure, in operation 611, the processor may control the display to display the generated second preview image frame. For example, as shown in the drawing of reference numeral 660 of FIG. 6E, the processor may control the display to display the second preview image frame. In another example, the processor may display an indicator 661 indicating a dynamic-tone-mapping-based recording state on one side (e.g., upper-left end) of the display. In another example, the processor may change the recording button 651 to a stop button 653 for stopping the recording. In another example, the processor may display a recording time on one side (e.g., the bottom center) of the display. Referring to the drawing of reference numerals of 650 and 660, preview-processing data (first preview-processing data) is applied to the first preview image frame, and thus the image quality of at least a part of an area (e.g., the area of reference numeral 663) of the second preview image frame may change (e.g., the brightness may increase or decrease, or the sharpness may increase). For example, the second preview image frame may include at least one object not shown in the first preview image frame. For example, first preview-processing data (e.g., a dynamic tone mapping) is applied to a dark part or a part represented in white in the first preview image frame due to bright light or darkness (e.g., a part in which a white-hole phenomenon occurs), and thus at least one object not shown in the first preview image frame may be shown in the second preview image frame.

According to an embodiment of the disclosure, in operation 613, the processor may identify whether the dynamic-tone-mapping-based recording has ended. When it is identified in operation 613 that the dynamic-tone-mapping-based recording has not ended, the processor may return to operation 605 and repeat operations 605 to 613. For example, the processor may load and analyze the next first preview image frame operation 605, select preview-processing data (second preview-processing data) based on a result of the analysis operation 607, and generate operation 609 and display operation 611 a second preview image frame based on the selected second preview-processing data. For example, referring to reference numerals 670 and 680, the second preview-processing data is applied to the next first preview image frame, and thus the image quality of at least a part of an area (e.g., the area of reference numeral 665) of the second preview image frame may change (e.g., the brightness may increase or decrease, or the sharpness may increase), and the image quality of the area of reference numeral 663 may further change (e.g., an increase in the sharpness or a change in color (e.g., the color becomes darker or brighter according to the change in brightness)).

According to an embodiment of the disclosure, at least some UI objects (e.g., the recording button 651, the stop button 653, the indicator 661, and the recording time) related to the dynamic-tone-mapping-based recording may be displayed using a status bar or a layer (hereinafter, referred to as "UI layer") that is different from a layer in which a preview is displayed (hereinafter, referred to as "preview layer). The UI layer or the status bar may be displayed on a screen upon receipt of a user input (e.g., a touch of a preview screen) (e.g., the UI layer may be displayed by overlapping the preview layer, or the status bar may be slidably displayed from the upper end to the lower end of a screen), and may disappear after a predetermined time.

According to an embodiment of the disclosure, as shown in FIG. 6F, the electronic device may apply, to a first preview image frame, preview-processing data selected based on a result of the analysis of a first preview image frame obtained by converting an original image frame, and may generate and display a second preview image frame in real time. According to an embodiment of the disclosure, at least one of N$^{th}$ preview-processing data, N+1$^{th}$ preview-processing data, N+2$^{th}$ preview-processing data, and/or N+3$^{th}$ preview-processing data may be different from one another. In another example, as another example corresponding to an original image frame, image data may be included. Meanwhile, when the result of the analysis of an N$^{th}$ first preview image frame, an N+1$^{th}$ first preview image, an N+2$^{th}$ first preview image frame, and/or an N+3$^{th}$ first preview image indicates that the frames are the same as or similar to one another, the N$^{th}$ preview-processing data, the N+1$^{th}$ preview-processing data, the N+2$^{th}$ preview-processing data, and/or the N+3$^{th}$ preview-processing data may be the same preview-processing data.

FIG. 6F illustrates that second preview image frames and pieces of preview-processing data are positioned on the same time axis, but the second preview image frames may be positioned to be delayed for the amount of image processing time according to application of the preview-processing data.

Figure 7A:
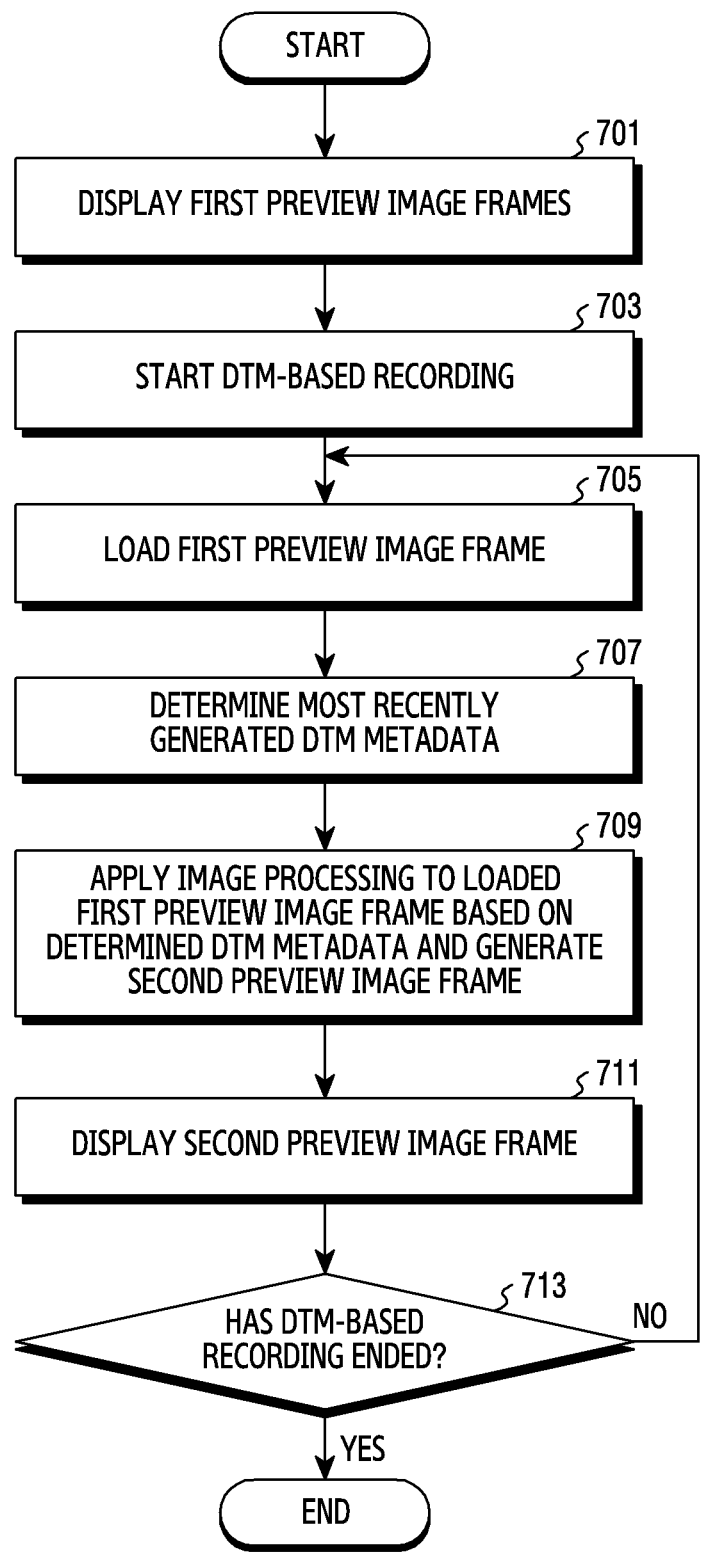
FIG. 7A is a flowchart illustrating a method for providing a preview using dynamic-tone-mapping metadata generated during dynamic-tone-mapping-based moving-image recording by an electronic device according to an embodiment of the disclosure.
Figure 7B:
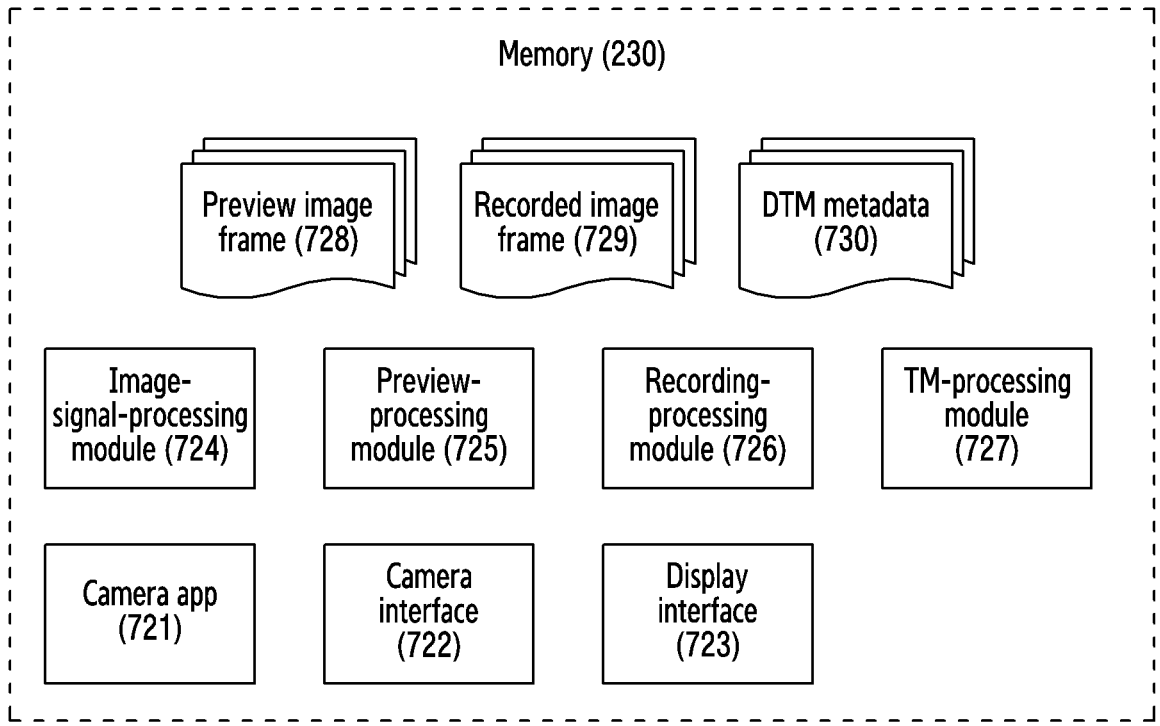
FIG. 7B illustrates a configuration of memory according to an embodiment of the disclosure.
Figure 7C:
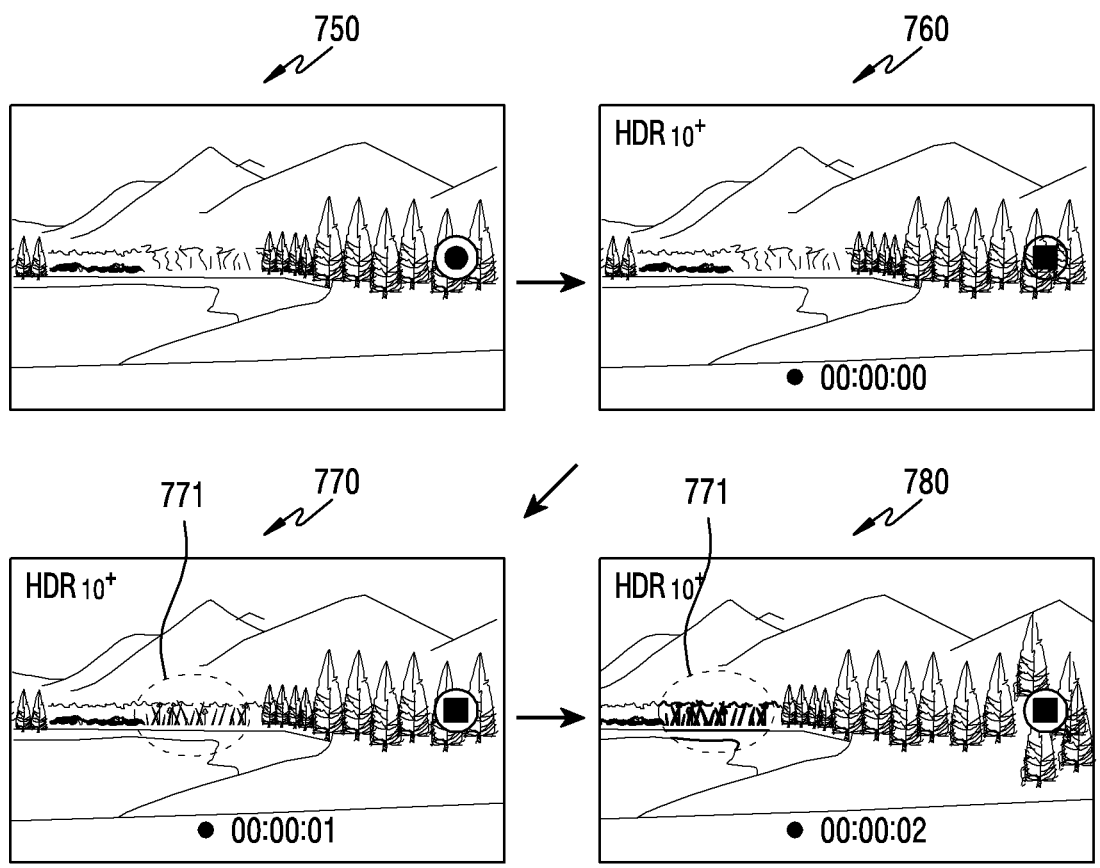
FIG. 7C illustrates a method for providing a preview using dynamic-tone-mapping metadata generated during dynamic-tone-mapping-based moving-image recording by an electronic device according to an embodiment of the disclosure.
Figure 7D:
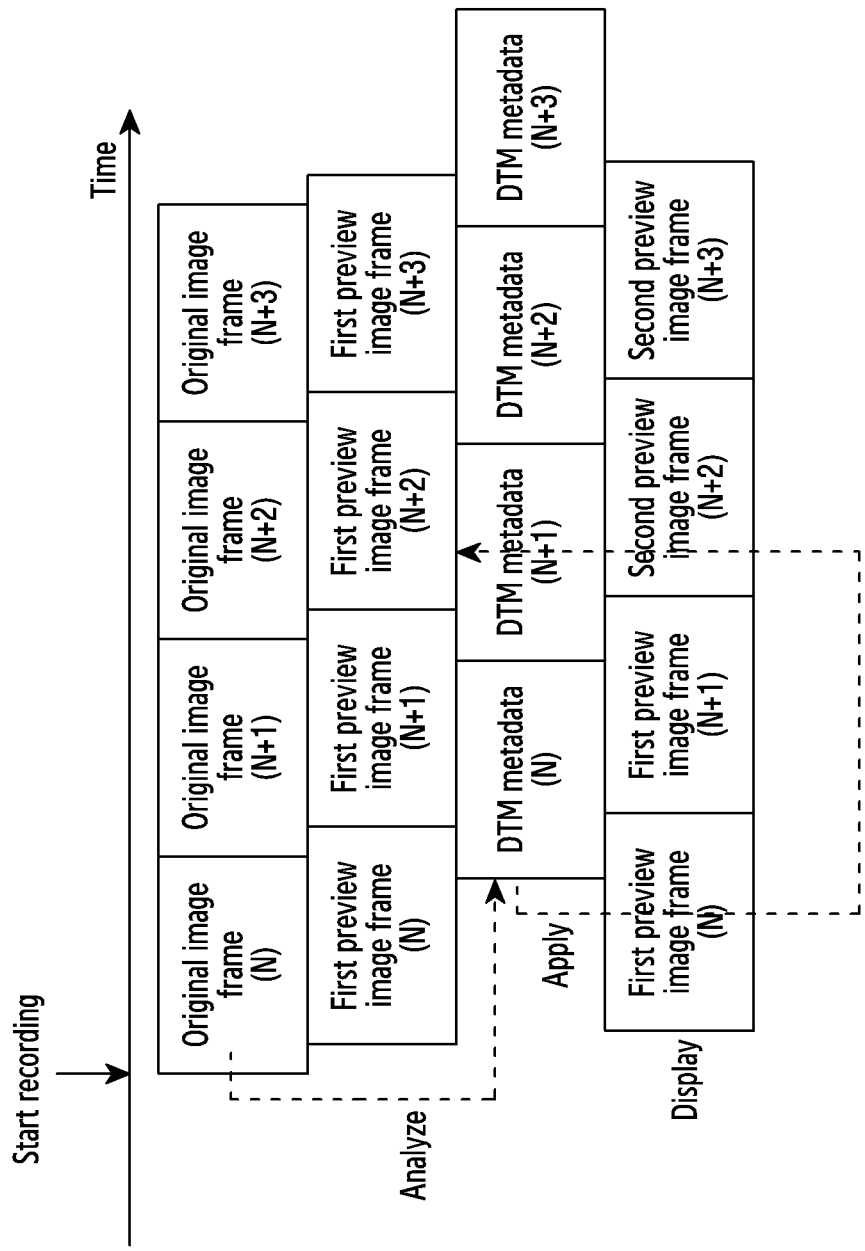
FIG. 7D illustrates a pipeline of image frames according to an embodiment of the disclosure.

FIG. 7A is a flowchart illustrating a method for providing a preview using dynamic-tone-mapping metadata generated during dynamic-tone-mapping-based moving-image recording by an electronic device according to an embodiment of the disclosure, FIG. 7B illustrates a configuration of memory according to an embodiment of the disclosure, FIG. 7C illustrates a method for providing a preview using dynamic-tone-mapping metadata generated during dynamic-tone-mapping-based moving-image recording by an electronic device according to an embodiment of the disclosure, and FIG. 7D illustrates a pipeline of image frames according to an embodiment of the disclosure.

Referring to FIGS. 7A, 7B, 7C, and 7D, according to an embodiment of the disclosure, in operation 701, a processor (e.g., the processor 120 of FIG. 1 or the processor 220 of FIG. 2) of an electronic device (e.g., the electronic device 101 of FIG. 1 or the electronic device 201 of FIG. 2) may control a display (e.g., the display device 160 of FIG. 1 or the display 260 of FIG. 2) to display first preview image frames. Referring to FIG. 7B, when a camera app 721 is executed, the processor may control an image-signal-processing module 724 to receive original image frames from a camera module (e.g., the camera module 180 of FIG. 1 or the camera module 280 of FIG. 2) through a camera interface 722 and to transmit the received original image frames to a preview-processing module 725, and may control the preview-processing module 725 to generate first preview image frames by converting the original image frames to make the original image frames suitable for the display specifications and store the generated first preview image frames as preview image frames 728. The display may load the preview image frames 728 through a display interface 723 to display the first preview image frames. For example, as shown in the drawing of reference numeral 750 of FIG. 7C, the processor may display first preview image frames on the display. According to an embodiment of the disclosure, similar to the image-signal-processing module 524 and/or the preview-processing module 525 of FIG. 5B, the image-signal-processing module 724 and/or the preview-processing module 725 may be implemented as hardware.

According to an embodiment of the disclosure, in operation 703, the processor may start dynamic-tone-mapping (DTM)-based recording. Operations 701 and 703 may be similar to operations 501 and 503 described above. For example, when the dynamic-tone-mapping-based recording starts, the processor may control a recording-processing module 726 to generate and store a recorded image frame 729 and dynamic-tone-mapping metadata 730. According to an embodiment of the disclosure, as shown in the drawing of reference numeral 760 of FIG. 7C, due to the time required to generate dynamic-tone-mapping metadata, not a second preview image frame but a first preview image frame may be displayed during a predetermined time (e.g. 1-2 frames) after the dynamic-tone-mapping-based recording starts. According to an embodiment of the disclosure, during a predetermined time after the dynamic-tone-mapping-based recording starts, a second preview image frame may be displayed using one of embodiments of FIGS. 5A to 5D or FIGS. 6A to 6F. According to an embodiment of the disclosure, similar to the recording-processing module 526 of FIG. 5B, the recording-processing module 726 may be included in the image-signal-processing module 724, or may be implemented as hardware.

According to an embodiment of the disclosure, in operation 705, the processor may load a first preview image frame. For example, the processor may control a tone-mapping processing module 727 to load a first preview image frame from the memory 230. Operation 705 may be similar to above-described operation 507. According to an embodiment of the disclosure, similar to the tone-mapping processing module 527 of FIG. 5B, the tone-mapping processing module 727 may be included in the image-signal-processing module 724, or may be implemented as hardware.

According to an embodiment of the disclosure, in operation 707, the processor may determine the most recently stored dynamic-tone-mapping metadata. For example, as shown in FIG. 7B, the processor may control the tone-mapping processing module 727 to determine, as dynamic-tone-mapping metadata to be applied to a first preview image frame, the most recently stored dynamic-tone-mapping metadata among pieces of dynamic-tone-mapping metadata 730 generated and stored by the recording-processing module 726. According to an embodiment of the disclosure, with regard to the determined dynamic-tone-mapping metadata, for example, as shown in FIG. 7D, in the case where the dynamic-tone-mapping metadata is generated to be delayed for about 1 frame from the original image frame, generation of $N^{th}$ dynamic-tone-mapping metadata by analyzing an $N^{th}$ original image frame (or an $N^{th}$ recorded image frame) may be completed during or at the time of display of an $N+1^{th}$ first preview image frame. According to various embodiments of the disclosure, the $N^{th}$ dynamic-tone-mapping metadata may be determined to be dynamic-tone-mapping metadata to be applied to an $N+2^{th}$ first preview image frame. According to an embodiment of the disclosure, when the generation of the $N^{th}$ dynamic-tone-mapping metadata ends before the $N+1^{th}$ first preview image frame is displayed, the $N^{th}$ dynamic-tone-mapping metadata may be determined to be dynamic-tone-mapping metadata to be applied to the $N+1^{th}$ first preview image frame. The determined dynamic-tone-mapping metadata may be transmitted to the tone-mapping processing module 727 (or may be loaded by the tone-mapping processing module 727). The determined tone mapping metadata may be used as preview-processing data.

According to an embodiment of the disclosure, in operation 709, the processor may apply image processing (e.g., dynamic-tone-mapping processing) to the loaded first preview image frame based on the determined dynamic-tone-mapping metadata to generate a second preview image frame. For example, the processor may control the tone-mapping processing module 727 to apply the determined dynamic-tone-mapping metadata (e.g., tone-mapping curve) to the loaded first preview image frame and generate a second preview image frame.

According to an embodiment of the disclosure, in operation 711, the processor may perform control to display the generated second preview image frame. For example, as shown in the drawing of reference numeral 770 of FIG. 7C, the processor may control the display to display the second preview image frame. The determined dynamic-tone-mapping metadata is applied to at least a part of an area (e.g., the area of reference numeral 771) of the second preview image frame, and the image quality thereof may change (e.g., the brightness may increase or decrease, or the sharpness may increase). For example, the second preview image frame may include at least one object not shown in the first preview image frame. According to an embodiment of the disclosure, in operation 713, the processor may identify whether the dynamic-tone-mapping-based recording has ended. When it is identified in operation 713 that the dynamic-tone-mapping-based recording has not ended, the processor may return to operation 705 and repeat operations 705 to 713. For example, referring to the drawing of reference numeral 780, other dynamic-tone-mapping metadata is applied to the first preview image frame, and the image quality of the area of reference numeral 771 may change (e.g., an increase in sharpness or a change in color (e.g., the color becomes darker or brighter according to the change in brightness)). According to an embodiment of the disclosure, at least part of UI objects related to the dynamic-tone-mapping-based recording may be displayed using a status bar or a UI layer that is distinguished from a preview layer. The UI layer or the status bar may be displayed on a screen upon a user input (e.g., a touch of a preview screen) (e.g., the UI layer may be displayed by overlapping the preview layer, or the status bar may be slidably displayed from the upper end to the lower end of a screen) and may disappear after a predetermined time.

According to an embodiment of the disclosure, as shown in FIG. 7D, the electronic device may apply, to the first preview image frame, the most recently generated dynamic-tone-mapping metadata with reference to the first preview image frame that is currently displayed (or that is to be displayed on the next frame), among pieces of dynamic-tone-mapping metadata generated by analyzing the original image frame.

According to an embodiment of the disclosure, when a scene change is detected, dynamic-tone-mapping metadata to be applied to first preview image frames after the scene change may be selected from among pieces of dynamic-tone-mapping metadata generated after the scene change. In this case, until the initial dynamic-tone-mapping metadata is generated after the scene change, basic preview-processing data may be applied to the first preview image frame, as shown in FIGS. 5A to 5D, or the preview-processing data selected after the analysis of the first preview image frame may be applied to the first preview image frame as shown in FIGS. 6A to 6F.

FIG. 7D illustrates that the second preview image frames and the first preview image frames are positioned at the same point along the time axis, but the second preview image frames may be positioned to be delayed for an amount of time due to application of the dynamic-tone-mapping metadata.

Figure 8A:
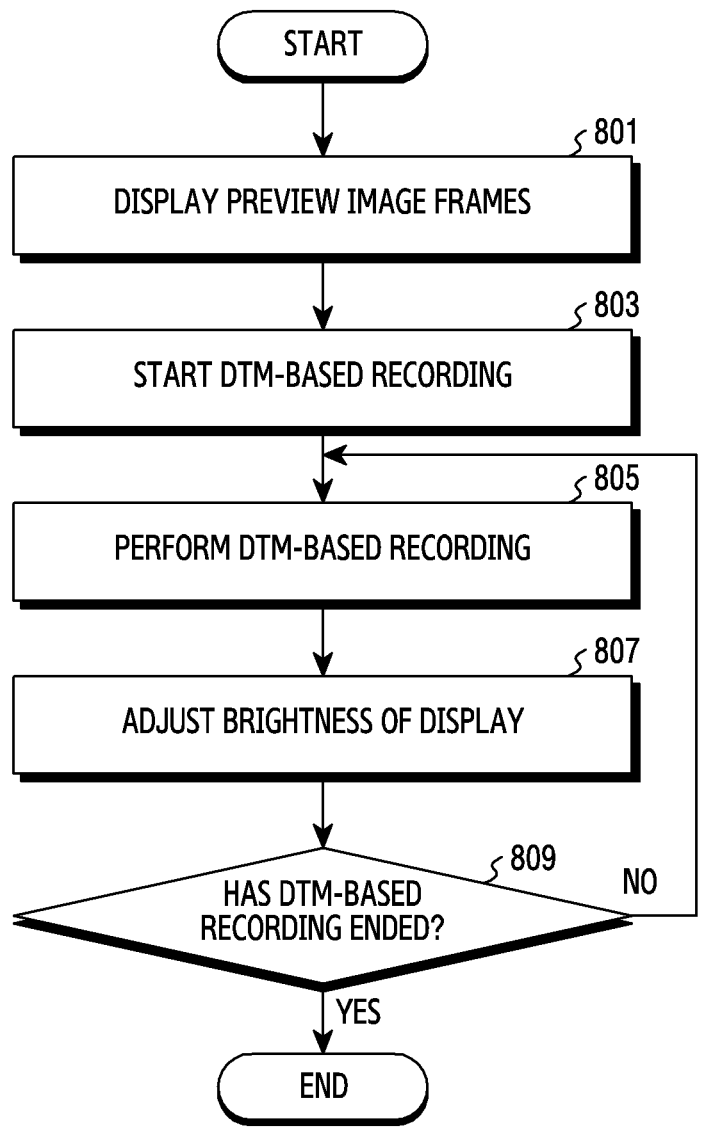
FIG. 8A is a flowchart illustrating a method for adjusting a brightness of a preview image by an electronic device according to an embodiment of the disclosure.
Figure 8B:
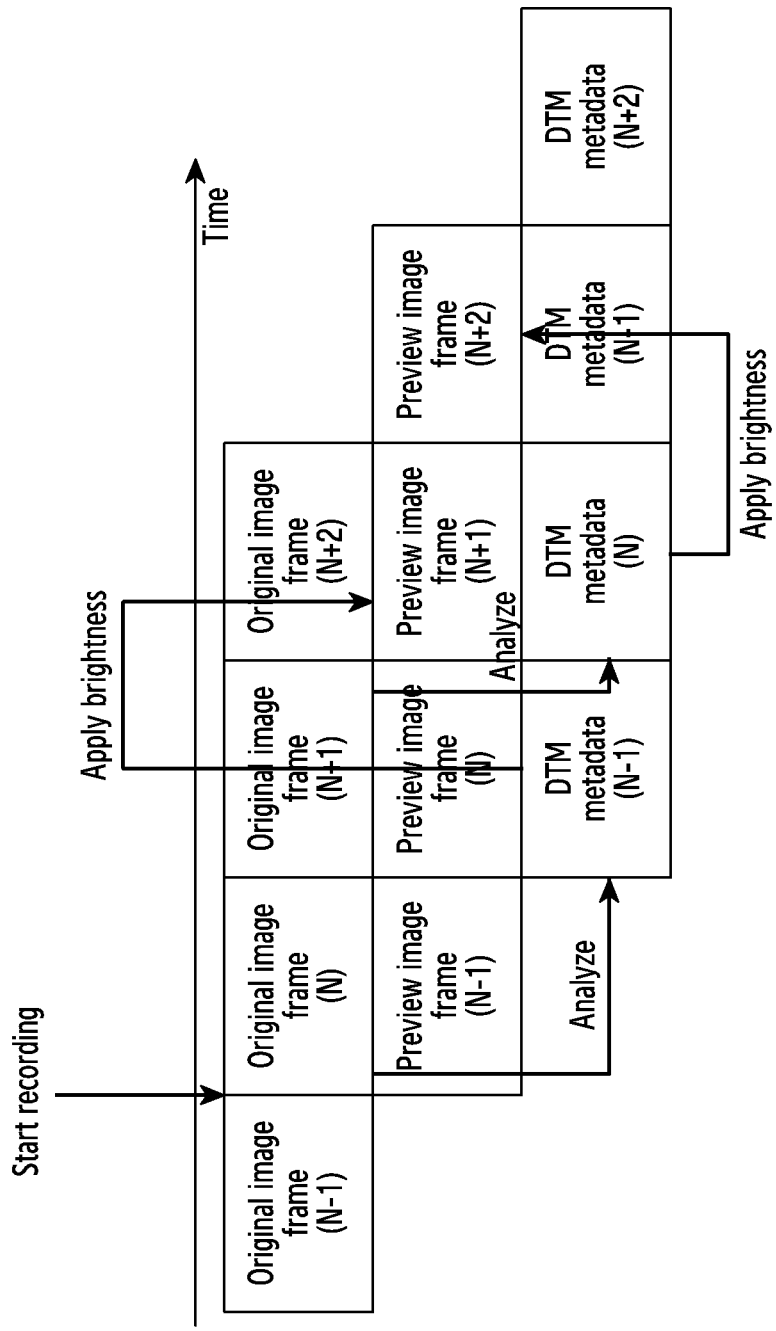
FIG. 8B illustrates a method for adjusting a brightness of a preview image by an electronic device according to an embodiment of the disclosure.

FIG. 8A is a flowchart illustrating a method for adjusting a brightness of a preview image by an electronic device according to an embodiment of the disclosure, and FIG. 8B illustrates a method for adjusting a brightness of a preview image by an electronic device according to an embodiment of the disclosure.

Referring to FIGS. 8A and 8B, in operation 801, a processor (e.g., the processor 120 of FIG. 1 or the processor 220 of FIG. 2) of an electronic device (e.g., the electronic device 101 of FIG. 1 or the electronic device 201 of FIG. 2) according to an embodiment may control a display (e.g., the display device 160 of FIG. 1 or the display 260 of FIG. 2) to display first preview image frames. For example, when a camera function is activated (e.g., when a camera application is executed), the processor may display a preview image frame corresponding to an original image frame acquired through a camera module (e.g., the camera module 180 of FIG. 1 or the camera module 280 of FIG. 2) on a display. The preview image frame may be generated to be suitable for the display specifications by converting (e.g., filtering out noise or adjusting the resolution and/or size of), by the processor, an original image frame acquired through a camera module. According to an embodiment of the disclosure, the conversion may be performed by an image signal processor (e.g., the image signal processor 221).

According to an embodiment of the disclosure, in operation 803, the processor may start dynamic-tone-mapping (DTM)-based recording. For example, the processor may start the dynamic-tone-mapping (DTM)-based recording in response to reception of a request to start the dynamic-tone-mapping (DTM)-based recording. The request may be received through a touch input on a soft menu (e.g., the recording button 651 of FIG. 6E) displayed on one side of the display or an input on a designated physical key.

When the dynamic-tone-mapping-based recording starts, in operation 805, the processor may perform the dynamic-tone-mapping-based recording. For example, the processor may store an original image frame (or may convert an original image frame and store the converted original image frame) as a recorded image frame. Further, the processor may analyze the original image frame or the recorded image frame to generate dynamic-tone-mapping metadata based on a result of the analysis. According to an embodiment of the disclosure, the processor may receive the result of the analysis of the original image frame or the recorded image frame from an image signal processor and generate dynamic-tone-mapping metadata based on the received result of the analysis.

According to an embodiment of the disclosure, in operation 807, the processor may adjust the brightness of the display. For example, the processor may adjust the brightness of the display based on a designated brightness or a designated scale ratio of brightness. The designated brightness and the designated scale ratio of brightness may be a value configured by a manufacturer or a value configured by a user. The designated brightness and the designated scale ratio of brightness may be updated by a manufacturer or a user.

According to an embodiment of the disclosure, the processor may analyze the original image frame, the recorded image frame, or the preview image frame and adjust the brightness of the display according to the result of the analysis. For example, the processor may analyze the preview image frame using at least one of feature point analysis, DPCM image analysis, edge analysis, or frequency-domain analysis, and adjust the brightness of the display based on a result of the analysis. In various embodiments of the disclosure, the method for analyzing an image frame is not limited.

According to another embodiment of the disclosure, the processor may adjust the brightness of the display based on static-tone-mapping information.

According to another embodiment of the disclosure, the processor may adjust the brightness of the display based on the most recently generated dynamic-tone-mapping metadata with reference to a current preview image frame (or the preview image frame to be displayed). For example, as shown in FIG. 8B, the processor may adjust the brightness of an $N+1^{th}$ preview image frame or an $N+2^{th}$ preview image frame based on $N-1^{th}$ dynamic-tone-mapping metadata or $N^{th}$ dynamic-tone-mapping metadata. For example, the processor may adjust the brightness of the $N+1^{th}$ preview image frame or the $N+2^{th}$ preview image frame based on at least one piece of information (e.g., percentile information, percentage information, or tone-mapping curve information) acquired by analyzing the $N-1^{th}$ dynamic-tone-mapping metadata or the $N^{th}$ dynamic-tone-mapping metadata. The information may mean the proportion of a pixel having a designated value or a brightness value in a designated range to the current frame.

According to another embodiment of the disclosure, the processor may adjust the brightness of the display based on at least one of a designated brightness, a designated scale ratio of brightness, static-tone-mapping information, a result of the analysis of the preview image frame, or the most recently dynamic-tone-mapping metadata.

According to another embodiment of the disclosure, the processor may adjust the brightness of the entire area of the display to the brightness determined by the above-described various methods. According to another embodiment of the disclosure, the processor may adjust the brightness of a partial area of the display to the brightness determined by the above-described various methods. The partial area of the display may include a group of pixels, each of which has a designated value, a group of pixels, each of which has a value in a designated range, and/or the internal area of an object detected through image analysis. According to another embodiment of the disclosure, the processor may divide the display into a plurality of areas and adjust the brightness of each of the areas. For example, a plurality of different pieces of dynamic-tone-mapping metadata may be applied to one image frame. Each piece of the dynamic-tone-mapping metadata may be configured to have different window ranges and to thus adjust the brightness of a corresponding area of a preview image frame.

According to an embodiment of the disclosure, in operation 809, the processor may identify whether dynamic-tone-mapping-based recording has ended. When it is identified in operation 809 that the dynamic-tone-mapping-based recording has not ended, the processor may return to operation 805 and repeat the above-described operations. When it is identified in operation 809 that the dynamic-tone-mapping-based recording has ended, the processor may end the procedure of adjusting the brightness of the preview image.

The method for adjusting the brightness in the above-described FIGS. 8A and 8B may be applied together with the generation of the second preview image frame in the above-described FIGS. 5A to 7D, either simultaneously or thereafter.

The case of adjusting the brightness of the display while performing the dynamic-tone-mapping-based recording is illustrated above as an example, but the method for adjusting the brightness of the display may also be performed when a menu item for the dynamic-tone-mapping-based recording is selected. For example, when a dynamic-tone-mapping-based recording function (or a dynamic-tone-mapping-based recording mode) is enabled (or activated) upon a first user input of selecting the menu item, the processor may adjust the brightness of the display based on at least one of designated brightness, a designated scale ratio of brightness, static-tone-mapping information, or a result of the analysis of a preview image frame after (immediately before) the time point at which the first user input is received. In this case, the state in which the dynamic-tone-mapping-based recording function is enabled corresponds to a standby state of the dynamic-tone-mapping-based recording (recoding is performed upon a touch of the recording button), and a preview image that is similar to an image to which dynamic-tone-mapping processing is applied may be provided through adjustment of the brightness of the display.

The processor may receive a second user input for requesting the dynamic-tone-mapping-based recording, perform the dynamic-tone-mapping-based recording in response to the second user input, and maintain the adjusted brightness or re-adjust the brightness of the display based on the most recently generated dynamic-tone-mapping metadata with reference to a current preview image frame, during the recording.

In the above-described embodiment of the disclosure, the quality of the preview image frame may change upon adjustment of the brightness of the display, wherein the quality of the preview image frame is adjusted to be similar to the quality of a moving image generated through a dynamic-tone-mapping-based recording. Accordingly, an electronic device according to an embodiment can reduce the difference between the quality of the preview image and the quality of the recorded image.

According to various embodiments of the disclosure, a method for providing a preview by an electronic device (e.g., the electronic device 101, 201) may comprise acquiring original image frames through a camera module (e.g., the camera module 180, 280), displaying, on a display (e.g., the display module 160, the display 260), first preview image frames corresponding to the acquired original image frames, receiving an input for requesting dynamic-tone-mapping-based recording, performing the dynamic-tone-mapping-based recording in response to the receiving of the input, and while performing the dynamic-tone-mapping-based recording, generating second preview image frames by performing dynamic-tone-mapping processing to first preview image frames acquired after a time point at which the input is received, and displaying the generated second preview image frames on the display.

According to various embodiments of the disclosure, the performing of the dynamic-tone-mapping-based recording may comprise generating a recorded image frame by converting each of the acquired original image frames, analyzing each of the acquired original image frames or the recorded image frame, generating dynamic-tone-mapping metadata based on a result of the analyzing, and storing the generated recorded image frame and the generated dynamic-tone-mapping metadata together in a memory.

According to various embodiments of the disclosure, the applying of the dynamic-tone-mapping processing may comprise: applying, to the first preview image frames acquired after the time point at which the input is received, most recently generated dynamic-tone-mapping metadata or one of at least one preview-processing data which is stored in the memory and has a non-linear curve shape.

According to various embodiments of the disclosure, the method may further comprise selecting preview-processing data to be applied to the first preview image frames after the time point at which the input is received, based on a selection by a user or image-capturing environment information of the electronic device when a plurality of preview-processing data exist.

According to various embodiments of the disclosure, the method may further comprise when a plurality of pieces of the preview-processing data exist: analyzing each of the first preview image frames after the time point at which the input is received, selecting one of the plurality of preview-processing data based on a result of the analyzing, and applying the selected preview-processing data to each of the first preview image frames after the time point at which the input is received.

According to various embodiments of the disclosure, the method may further comprise controlling a brightness of the display when the first preview image frames or the generated second preview image frames are displayed.

According to various embodiments of the disclosure, the controlling of the brightness of the display may comprise one of fixing the brightness of the display based on a designated brightness or a designated scale ratio of brightness, analyzing each of the first preview image frames, determining the brightness of the display based on a result of the analyzing, and adjusting the brightness of the display to the determined brightness, or determining the brightness of the display based on most recently generated first dynamic-tone-mapping metadata and adjusting the brightness of the display to the determined brightness.

According to various embodiments of the disclosure, the controlling of brightness of the display may comprise adjusting a brightness of an entire area of the display to the designated brightness, the designated scale ratio of brightness, or the determined brightness; or dividing the display into a plurality of areas and adjusting a brightness of each of the areas of the display.

An electronic device according to various embodiments may provide, in real time, a preview image similar to an image to which dynamic tone mapping is applied, or a preview image to which dynamic tone mapping is applied. Accordingly, according to various embodiments of the disclosure, the quality of a preview image may be the same as or similar to the quality of a stored image. A user of an electronic device according to various embodiments can easily recognize the quality of a stored image through a preview image.

The electronic device according to various embodiments may be one of various types of electronic devices. The electronic devices may include, for example, and without limitation, a portable communication device (e.g., a smart phone), a computer device, a portable multimedia device, a portable medical device, a camera, a wearable device, a home appliance, or the like. According to an embodiment of the disclosure, the electronic devices are not limited to those described above.

It should be appreciated that the various example embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, firmware or any combination thereof, and may interchangeably be used with other terms, for example, "logic," "logic block," "part," or "circuitry". A module may be a single integral component, or a minimum unit or part thereof, adapted to perform one or more functions. For example, according to an embodiment of the disclosure, the module may be implemented in a form of an application-specific integrated circuit (ASIC).

Various embodiments as set forth herein may be implemented as software (e.g., the program 140) including one or more instructions that are stored in a storage medium (e.g., internal memory 136, or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code made by a complier or a code executable by an interpreter. The machine-readable storage medium may be provided in the form of a non-transitory storage medium. The "non-transitory" storage medium is a tangible device, and may not include a signal (e.g., an electromagnetic wave), but this term does not differentiate between where data is semi-permanently stored in the storage medium and where the data is temporarily stored in the storage medium.

According to an embodiment of the disclosure, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments of the disclosure, each component (e.g., a module or a program) of the above-described components may include a single entity or multiple entities, and some of the multiple entities may be separated and disposed to other component. According to various embodiments of the disclosure, one or more of the above-described components may be omitted, or one or more other components may be added. Alternatively or additionally, a plurality of components (e.g., modules or programs) may be integrated into a single component. In such a case, according to various embodiments of the disclosure, the integrated component may perform one or more functions of each of the plurality of components in the same or similar manner as they are performed by a corresponding one of the plurality of components before the integration. According to various embodiments of the disclosure, operations performed by the module, the program, or another component may be carried out sequentially, in parallel, repeatedly, or heuristically, or one or more of the operations may be executed in a different order or omitted, or one or more other operations may be added.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An electronic device comprising:
   a camera;
   a display;
   a processor operatively connected to the camera and the display; and
   a memory operatively connected to the processor,
   wherein the memory stores instructions which, when executed, cause the processor to:
      acquire original image frames through the camera,
      display, on the display, first preview image frames corresponding to the acquired original image frames,
      receive an input for requesting dynamic-tone-mapping-based recording,
      perform the dynamic-tone-mapping-based recording in response to the receiving of the input, and while performing of the dynamic-tone-mapping-based recording, generate second preview image frames by performing dynamic-tone-mapping processing to first preview image frames acquired after a time point at which the input is received, and display the generated second preview image frames on the display.

2. The electronic device of claim 1, wherein the memory further stores instructions which, when executed, cause the processor to:
generate a recorded image frame by converting each of the acquired original image frames,
analyze each of the acquired original image frames or the recorded image frame,
generate dynamic-tone-mapping metadata based on a result of the analyzing, and
perform the dynamic-tone-mapping-based recording in which the recorded image frame and the generated dynamic-tone-mapping metadata are stored together in the memory.

3. The electronic device of claim 1, wherein the memory further stores instructions which, when executed, cause the processor to:
apply, to the first preview image frames acquired after the time point at which the input is received, most recently generated dynamic-tone-mapping metadata or one of at least one preview-processing data which is stored in the memory and has a non-linear curve shape, to perform the dynamic-tone-mapping processing.

4. The electronic device of claim 3, wherein the memory further stores instructions which, when executed, cause the processor to:
select preview-processing data to be applied to each of the first preview image frames after the time point at which the input is received, based on a selection by a user or image-capturing environment information of the electronic device when a plurality of preview-processing data exist.

5. The electronic device of claim 3, wherein the memory further stores instructions which, when executed, cause the processor to, when a plurality of preview-processing data exist:
analyze each of the first preview image frames after the time point at which the input is received,
select one of the plurality of preview-processing data based on a result of the analyzing, and
apply the selected preview-processing data to each of the first preview image frames after the time point at which the input is received.

6. The electronic device of claim 3, wherein the at least one preview-processing data is added or updated through learning.

7. The electronic device of claim 1, wherein the memory further stores an instruction which, when executed, causes the processor to:
control a brightness of the display when the first preview image frames or the generated second preview image frames are displayed.

8. The electronic device of claim 7, wherein the instruction configured to control the brightness of the display further causes the processor to:
fix the brightness of the display based on a designated brightness or a designated scale ratio of brightness,
analyze each of the first preview image frames and adjust the brightness of the display to a brightness determined based on a result of the analyzing, or
adjust the brightness of the display to a brightness determined based on most recently generated first dynamic-tone-mapping metadata.

9. The electronic device of claim 8, wherein the instruction configured to control the brightness of the display further causes the processor to:
adjust a brightness of an entire area of the display to the designated brightness, the designated scale ratio of brightness, or the determined brightness.

10. The electronic device of claim 7, wherein the instruction configured to control the brightness of the display further causes the processor to:
divide the display into a plurality of areas and adjust a brightness of each of the areas of the display.

11. The electronic device of claim 1, wherein the second preview image frames are different from the first preview image frames based on at least one of color, tone, or brightness.

12. A method for providing a preview by an electronic device, the method comprising:
acquiring original image frames through a camera;
displaying, on a display, first preview image frames corresponding to the acquired original image frames;
receiving an input for requesting dynamic-tone-mapping-based recording;
performing the dynamic-tone-mapping-based recording in response to the receiving of the input; and
while performing the dynamic-tone-mapping-based recording, generating second preview image frames by performing dynamic-tone-mapping processing to first preview image frames acquired after a time point at which the input is received, and displaying the generated second preview image frames on the display.

13. The method of claim 12, wherein the performing of the dynamic-tone-mapping-based recording comprises:
generating a recorded image frame by converting each of the acquired original image frames;
analyzing each of the acquired original image frames or the recorded image frame;
generating dynamic-tone-mapping metadata based on a result of the analyzing; and
storing the generated recorded image frame and the generated dynamic-tone-mapping metadata together in a memory.

14. The method of claim 12, wherein the performing of the dynamic-tone-mapping recording comprises:
applying, to the first preview image frames acquired after the time point at which the input is received, most recently generated dynamic-tone-mapping metadata or one of at least one preview-processing data which is stored in a memory and has a non-linear curve shape.

15. The method of claim 14, further comprising selecting preview-processing data to be applied to the first preview image frames after the time point at which the input is received, based on a selection by a user or image-capturing environment information of the electronic device when a plurality of preview-processing data exist.

16. The method of claim 14, further comprising, when a plurality of preview-processing data exist:
analyzing each of the first preview image frames after the time point at which the input is received;
selecting one of the plurality of preview-processing data based on a result of the analyzing; and
applying the selected preview-processing data to each of the first preview image frames after the time point at which the input is received.

17. The method of claim 12, further comprising:
controlling a brightness of the display when the first preview image frames or the generated second preview image frames are displayed.

18. The method of claim 17, wherein the controlling of the brightness of the display comprises one of:
fixing the brightness of the display based on a designated brightness or a designated scale ratio of brightness;
analyzing each of the first preview image frames, determining the brightness of the display based on a result of the analyzing, and adjusting the brightness of the display to the determined brightness; or
determining the brightness of the display based on most recently generated first dynamic-tone-mapping metadata and adjusting the brightness of the display to the determined brightness.

19. The method of claim 18, wherein the controlling of brightness of the display comprises:
adjusting a brightness of an entire area of the display based on the designated brightness, the designated scale ratio of brightness, or the determined brightness; or
dividing the display into a plurality of areas and adjusting a brightness of each of the areas of the display.

20. An electronic device comprising:
a camera;
a display;
a processor operatively connected to the camera and the display; and
a memory operatively connected to the processor,
wherein the memory stores instructions which, when executed, cause the processor to:
display, on the display, preview image frames corresponding to original image frames acquired through the camera,
in response to reception of a first user input enabling a function of dynamic-tone-mapping-based recording or a second user input for requesting the dynamic-tone-mapping-based recording, adjust a brightness of the display based on at least one of a designated brightness, a designated scale ratio of brightness, static-tone-mapping information, or a result of analysis of a preview image frame after a time point at which the first user input is received,
perform the dynamic-tone-mapping-based recording in response to the reception of the second user input, and while performing the dynamic-tone-mapping-based recording, control the brightness of the display to maintain the adjusted brightness, or readjust the brightness of the display based on most recently generated dynamic-tone-mapping metadata with reference to a current preview image frame.

* * * * *